(12) United States Patent
Sakata et al.

(10) Patent No.: US 6,663,191 B2
(45) Date of Patent: Dec. 16, 2003

(54) HYDRAULIC BRAKE APPARATUS FOR A VEHICLE

(75) Inventors: Yasunori Sakata, Toyota (JP); Yasuhito Ishida, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/052,548

(22) Filed: Jan. 23, 2002

(65) Prior Publication Data

US 2002/0096939 A1 Jul. 25, 2002

(30) Foreign Application Priority Data

Jan. 23, 2001 (JP) ........................................ 2001-014074

(51) Int. Cl.[7] .............................................. B60T 8/32
(52) U.S. Cl. ............................................. 303/3; 303/20
(58) Field of Search ............................ 303/3, 20, 114.1, 303/191

(56) References Cited

U.S. PATENT DOCUMENTS 6,203,123 B1 * 3/2001 Oyama ....................... 303/191
6,322,164 B1 * 11/2001 Sakamoto et al. ........ 303/115.4
6,450,591 B1 * 9/2002 Kawahata et al. ........ 303/122.5
2001/0004723 A1 * 6/2001 Nishiyama .................... 701/79
2001/0006306 A1 * 7/2001 Kagawa et al. ............... 303/20

FOREIGN PATENT DOCUMENTS

| DE | 197 03 776 A1 | 8/1998 |
| DE | 101 42 040 A1 | 6/2002 |
| JP | 11-201314 A | 7/1999 |

* cited by examiner

*Primary Examiner*—Christopher P. Schwartz
(74) *Attorney, Agent, or Firm*—Burns, Doane, Swecker & Mathis, LLP

(57) ABSTRACT

A vehicle hydraulic brake apparatus includes a linear solenoid valve unit for controlling a power hydraulic pressure supplied to a master cylinder from an auxiliary hydraulic pressure source. Master cylinder hydraulic pressure from the master cylinder detected by a pressure sensor is compared with a predetermined reference hydraulic pressure when the linear solenoid valve unit is electrically excited under a condition that the communication between the master cylinder and the wheel cylinders is interrupted by a hydraulic pressure control valve device disposed between the master cylinder and the wheel brake cylinders while the vehicle engine is activated and a brake operating member is not operated. The electric current supplied to the linear solenoid valve unit is corrected in response to a result of this comparison.

20 Claims, 12 Drawing Sheets

HYDRAULIC BRAKE APPARATUS FOR A VEHICLE

This application is based on and claims priority under 35 U.S.C. §119 with respect to a Japanese Patent Application 2001-014074, filed on Jan. 23, 2001, the entire content of which is incorporated herein by reference.

1. Field of the Invention

This invention generally relates to a hydraulic brake apparatus. More particularly, this invention pertains to a vehicle hydraulic brake apparatus provided with a master cylinder, including a master piston and an auxiliary hydraulic pressure source, with the master piston being driven by power hydraulic pressure supplied from a auxiliary hydraulic pressure source via a linear solenoid valve unit.

2. Background of the Invention

Various vehicle hydraulic brake apparatus are known One type of vehicle hydraulic brake apparatus is disclosed in German Patent Laid-Open Publication No. 197 03 776A1. This hydraulic brake apparatus is provided with a master cylinder, a hydraulic pressure type boosting mechanism provided with a booster piston, a pump driven by an electric motor, and a pressure control valve for controlling a boosted hydraulic pressure applied to the booster piston. The hydraulic pressure discharged from the pump is controlled by the pressure control valve controlled by a proportioning solenoid mechanism so that various controls including a traction control and a vehicle stability control are performed. The pressure control valve, including the proportioning solenoid mechanism, corresponds to a linear solenoid valve.

However, in the above-described hydraulic brake apparatus, the desired controls may not be accurately performed due to errors associated with the solenoid mechanism. That is, fluctuations due to electric control of the solenoid mechanism and fluctuations due to mechanical components comprising the solenoid mechanism may have an affect on the proper performance of the control operations. Therefore, the characteristics of the solenoid mechanism need to be checked at a proper timing and should be corrected when needed.

Japanese Patent Laid-Open Publication No. 11-201314 discloses a correcting device for correcting characteristics of a solenoid valve. The characteristics of the solenoid valve may fluctuate due to fluctuations in the set load of a return spring. The correcting device is employed for compensating during the manufacturing process the fluctuating characteristics of the solenoid valve used, for example, for controlling the hydraulic pressure operating a vehicle automatic transmission. Therefore, according to this publication, an adjusting mechanism is not required to be mounted on the solenoid valve.

In the above-described Japanese publication, the fluid amount or fluid pressure is set to be controlled by the solenoid valve for the purpose of checking the characteristics of the solenoid valve. Electric current supplied to the solenoid valve is adjusted to match the fluid amount or the fluid pressure to a target fluid amount or a target fluid pressure to carry out the check, respectively. The difference between a predetermined electric current for design corresponding to the target fluid amount or the target fluid pressure for the check and the electric current actually required to meet the target fluid amount or the target fluid pressure is calculated based upon the relationship between the predetermined electric current and the target fluid amount or the target fluid pressure. Information for correcting the actually supplied electric current is calculated based upon the aforementioned difference and is memorized by a control device for controlling the solenoid valve.

Therefore, correction for the characteristics of the solenoid valve as a single unit can be effected as described above. That is, initial fluctuations of the solenoid valve as a single unit during the manufacturing stage can be corrected. However, the above-described Japanese publication does not disclose effecting correction for the characteristics of the solenoid valve mounted on the vehicle. Further, even if the correction for the characteristics of the solenoid valve as a single unit as described in the above Japanese publication is applied to the solenoid mechanism described in the German publication mentioned above, a desired effect may not be easily produced when brake control is performed during running of the vehicle.

That is, after the solenoid valve has been mounted on the vehicle, the characteristics of the solenoid valve may vary due to aging distortion of the solenoid valve itself, electric voltage characteristics, and the like. Further, temperature characteristics of the solenoid valve may vary due to a vehicle running condition such as a vehicle speed, an actuating condition of the solenoid valve, and the like. As a result, a desired brake control in the hydraulic brake apparatus described in aforementioned German publication may not be effected due to characteristic variations such as those mentioned above.

Accordingly, the disclosed vehicle hydraulic brake apparatus is still susceptible of certain improvements with respect to monitoring the characteristics of the solenoid valve already mounted on the hydraulic brake apparatus and correcting the characteristics of the solenoid valve when needed.

A need thus exists for the electric current actually supplied to the linear solenoid valve unit mounted on the vehicle to be accurately corrected so that predetermined brake controls can be accurately performed by the hydraulic brake apparatus.

SUMMARY OF THE INVENTION

According to one aspect, a hydraulic brake apparatus for a vehicle includes a brake operating member, a master cylinder including a master piston which is moved forward in response to a depressing operation of the brake operating member for pressurizing brake fluid in a reservoir and outputting a master cylinder hydraulic pressure to wheel brake cylinders mounted on respective vehicle wheels in response to the forward movement of the master piston, an auxiliary hydraulic pressure source for pressurizing the brake fluid in the reservoir to a predetermined pressure level and for outputting a power hydraulic pressure, master piston driving means for driving the master piston with the power hydraulic pressure outputted from the auxiliary hydraulic pressure source, and a linear solenoid valve unit for controlling the power hydraulic pressure supplied to the master piston driving means from the auxiliary hydraulic pressure source and for controlling a driving force applied to the master piston. A hydraulic pressure control valve device is disposed between the master cylinder and the wheel brake cylinders for controlling the master cylinder hydraulic pressure supplied to the wheel brake cylinders, a pressure sensor detects the master cylinder hydraulic pressure, and control means controls the linear solenoid valve unit and the hydraulic pressure control valve device. The control means includes comparing means for comparing the master cylinder hydraulic pressure detected by the pressure sensor with a predetermined reference hydraulic pressure when the linear solenoid valve unit is electrically excited under a condition that a communication between the master cylinder and the wheel brake cylinders is interrupted by the hydraulic pressure control valve device during a vehicle engine being activated and the brake operating member being not operated, and correcting means for correcting an electric current actually supplied to the linear solenoid valve unit in response to a comparison result by the comparing means. The control means further includes a correcting means for correcting electric current actually supplied to the linear solenoid valve unit in response to the result of the comparison performed by the comparing means.

Preferably, the control means also includes estimating means for estimating a temperature of the linear solenoid valve unit at a predetermined period based upon the excitation condition of the linear solenoid valve unit and the vehicle running condition. In this case, the electric current actually supplied to the linear solenoid valve unit is corrected by the correcting means when a variation of an estimated temperature per period continues to be less than a predetermined value for a predetermined period of time.

The hydraulic brake apparatus preferably also includes a brake operating detecting means for detecting whether or not the brake operating member is operated, with the control means terminating the correction of the electric current actually supplied to the linear solenoid valve unit when it is judged based upon a detected result by the brake operating detecting means that the brake operating member is operated.

The master piston driving means includes a regulating means connected to the auxiliary hydraulic pressure source and the reservoir for regulating the power hydraulic pressure outputted from the auxiliary hydraulic pressure source to a predetermined pressure level for driving the master piston by the regulated hydraulic pressure. Therefore, the linear solenoid valve unit controls the power hydraulic pressure supplied from the auxiliary hydraulic pressure source to the regulating means.

According to another aspect, a hydraulic brake apparatus for a vehicle includes a brake operating member, a master cylinder which pressurizes brake fluid in a reservoir through movement of a master piston and outputs a master cylinder hydraulic pressure to wheel brake cylinders in response to the movement of the master piston, an auxiliary hydraulic pressure source connected to the master cylinder to pressurize the brake fluid in the reservoir to a predetermined pressure level and output a power hydraulic pressure to drive the master piston, a linear solenoid valve unit disposed between the master cylinder and the auxiliary hydraulic pressure source to control the power hydraulic pressure supplied to the master cylinder from the auxiliary hydraulic pressure source and control a driving force applied to the master piston, a hydraulic pressure control valve device disposed between the master cylinder and the wheel brake cylinders for controlling the master cylinder hydraulic pressure supplied to the wheel brake cylinders, and a pressure sensor which detects the master cylinder hydraulic pressure. The apparatus is also provided with comparing means which compares the master cylinder hydraulic pressure detected by the pressure sensor with a predetermined reference hydraulic pressure during electrical excitation of the linear solenoid valve unit when communication between the master cylinder and the wheel brake cylinders is interrupted by the hydraulic pressure control valve device and while an engine of the vehicle is activated and the brake operating member is not operated, and correcting means which corrects electric current actually supplied to the linear solenoid valve unit in response to a result of the comparison performed by the comparing means.

Another aspect involves a method of controlling the supply of electric current to a linear solenoid valve unit in a vehicle hydraulic brake apparatus. The vehicle hydraulic brake apparatus includes a brake operating member, a master cylinder which pressurizes brake fluid in a reservoir through movement of a master piston and outputs a master cylinder hydraulic pressure to wheel brake cylinders mounted on vehicle wheels in response to the movement of the master piston, an auxiliary hydraulic pressure source which pressurizes the brake fluid in the reservoir to a predetermined pressure level and outputs a power hydraulic pressure to move the master piston, and a hydraulic pressure control valve device disposed between the master cylinder and the wheel brake cylinders for controlling the master cylinder hydraulic pressure supplied to the wheel brake cylinders. The linear solenoid valve unit controls the power hydraulic pressure supplied to the master cylinder from the auxiliary hydraulic pressure source to control the driving force applied to the master piston. The method involves detecting the master cylinder hydraulic pressure, comparing the detected master cylinder hydraulic pressure with a predetermined reference hydraulic pressure when the linear solenoid valve unit is electrically excited while communication between the master cylinder and the wheel brake cylinders is interrupted by the hydraulic pressure control valve device and while an engine of the vehicle is activated and the brake operating member is not operated, and correcting electric current actually supplied to the linear solenoid valve unit the comparison of the detected master cylinder hydraulic pressure with the predetermined reference hydraulic pressure.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
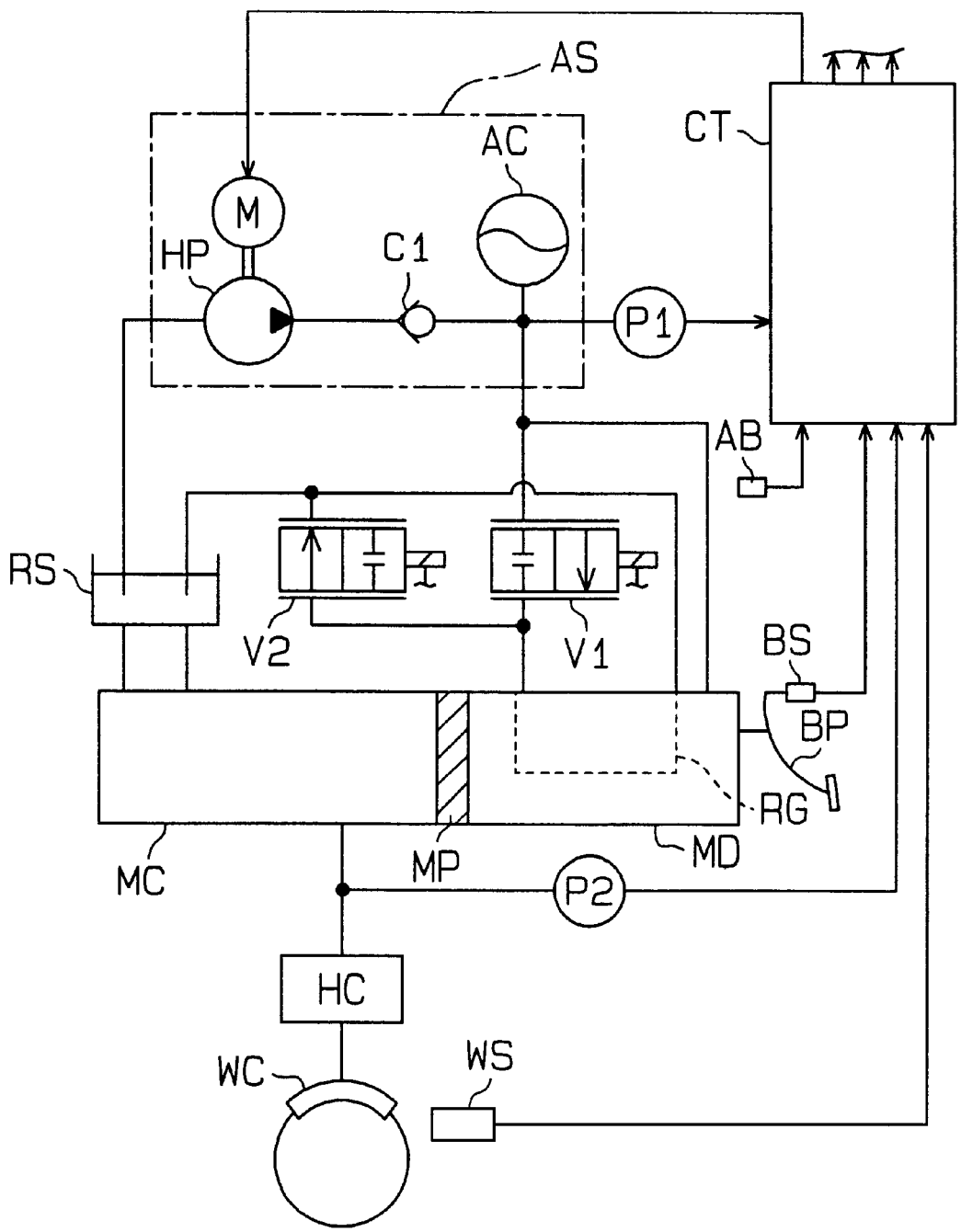
FIG. 1 is a schematic illustration of a hydraulic brake apparatus according to an embodiment of the present invention.

Referring to FIG. 1, a hydraulic brake apparatus according to a embodiment of the present invention is provided with a master cylinder MC, in which is provided a master piston MP, and an auxiliary hydraulic pressure source AS. The master piston MP is moved forward (i.e., to the left in FIG. 1) in response to the depressing operation of a brake pedal BP constituting a brake operating member. Brake fluid from a reservoir RS is thus pressurized in the master cylinder MC so that a brake hydraulic pressure is outputted from the master cylinder MC to each wheel brake cylinder WC mounted on a respective vehicle wheel. The auxiliary hydraulic pressure source AS increases the brake fluid in the reservoir RS to a predetermined pressure level to output a power hydraulic pressure.

The hydraulic brake apparatus is also provided with a master piston driving means MD for driving the master piston MP using the power hydraulic pressure outputted from the auxiliary hydraulic pressure source AS. The master piston driving means MD is connected to the auxiliary hydraulic pressure source AS and is further connected to the reservoir RS. The master piston driving means MD includes a regulator RG for regulating the power hydraulic pressure outputted from the auxiliary hydraulic pressure source AS to meet a predetermined pressure level and for driving the master piston MP with the regulated hydraulic pressure.

The hydraulic brake apparatus is additionally provided with a linear solenoid valve unit for controlling the power hydraulic pressure supplied from the auxiliary hydraulic pressure source AS to the master piston driving means MD so as to control the driving force applied to the master piston MP. The linear solenoid valve unit is comprised of a normally closed type linear solenoid valve V1 and a normally open type linear solenoid valve V2. The linear solenoid valve V1 controls the opening/closing operation of a hydraulic pressure supplying passage for connecting the regulator RG with the auxiliary hydraulic pressure source AS. The linear solenoid valve V2 controls the opening/closing operation of a hydraulic pressure discharging passage for connecting the regulator RG with the reservoir RS.

The auxiliary hydraulic pressure source AS is provided with a check valve C1, an accumulator AC, and a hydraulic pressure pump HP driven by an electric motor M. The inlet side of the hydraulic pressure pump HP is connected to the reservoir RS and the outlet side of the hydraulic pressure pump HP is connected to the accumulator AC and to the linear solenoid valve V1 via the check valve C1.

The hydraulic brake apparatus according to the illustrated embodiment is further provided with a hydraulic pressure control valve device HC, comprised of a plurality of linear solenoid valves, disposed between the master cylinder MC and the wheel brake cylinders WC. Further, an electronic control device CT (a controlling means) controls the hydraulic pressure control valve device HC and the linear solenoid valves V1, V2. The details of the electronic control device CT will be described later with reference to FIG. 2.

An anti-skid control is effected by controlling the hydraulic pressure control valve device HC by way of the electronic control device CT. Further, when the hydraulic pressure control valve device HC interrupts communication between the master cylinder MC and the wheel brake cylinder WC when the vehicle engine is activated and the brake pedal BP is not operated, the linear solenoid valves V1, V2 are controlled by the electronic control device CT and the master cylinder hydraulic pressure is regulated and supplied to each wheel brake cylinder WC independent from the depressing operation of the brake pedal BP so that an automatic brake control is effected.

The hydraulic brake apparatus is further provided with a pressure sensor P1 for detecting a power hydraulic pressure accumulated in the accumulator AC, a pressure sensor P2 for detecting the master cylinder hydraulic pressure, a vehicle wheel speed sensor WS for detecting a vehicle wheel rotating speed, a brake switch BS which is turned on/off in response to the depressing operation of the brake pedal BP, and an automatic brake switch AB. The automatic brake switch AB can be turned on by a driver to correspond to or effect the driver's intention to perform the automatic brake control.

Figure 2:
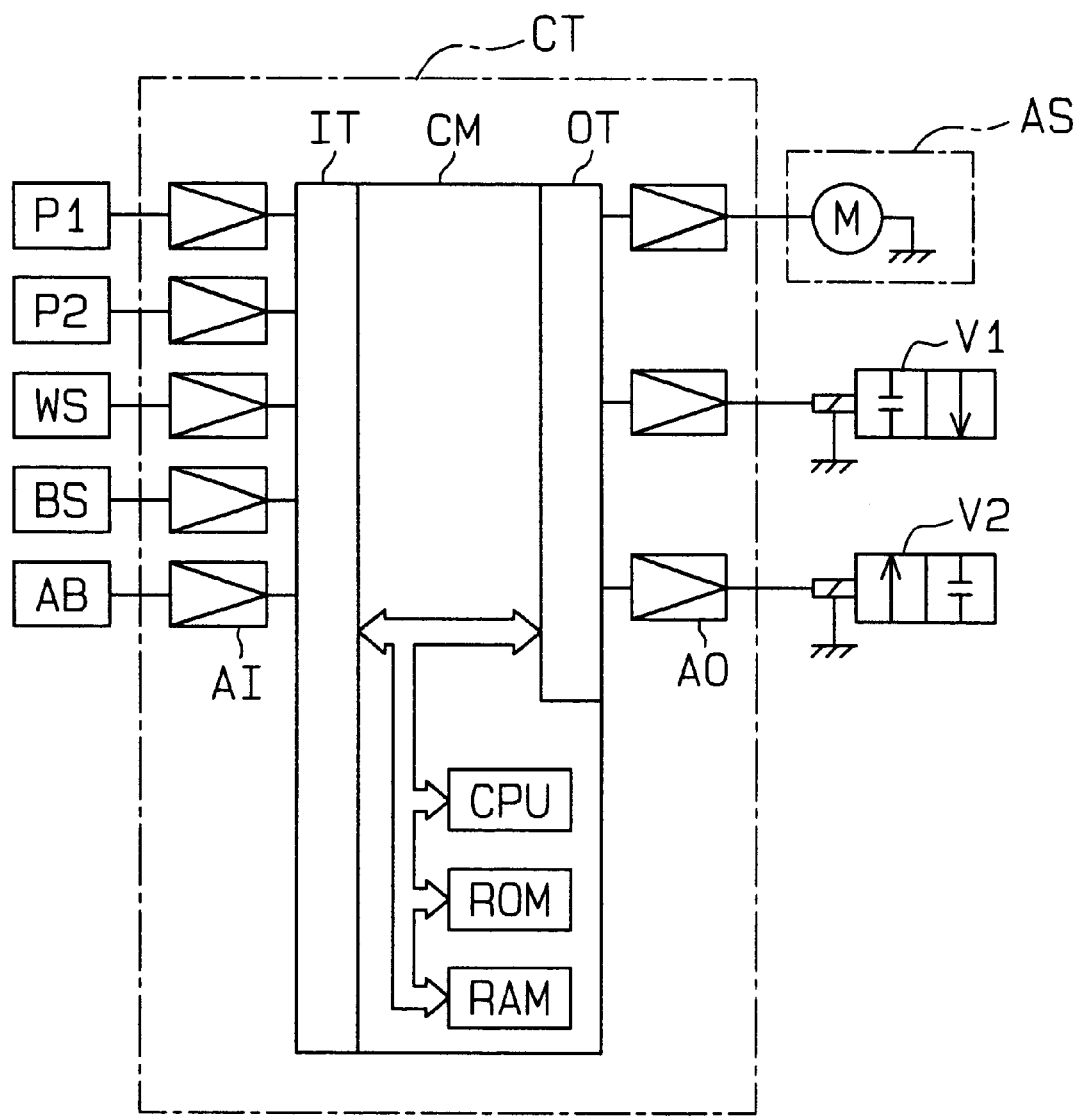
FIG. 2 is a schematic illustration of the control means used in the apparatus shown in FIG. 1.

As illustrated in FIG. 2, the electronic control device CT is comprised of a microcomputer CM provided with a central processing unit CPU, a read only memory ROM, a random access memory RAM, an input interface IT, and an output interface OT which are connected via bus. The sensors P1, P2, WS and the switches BS, AB are operatively connected to the electronic control device CT and signals outputted from the sensors P1, P2, WS and the switches BS, AB are inputted to the CPU via each amplifying circuit A1 and the input interface IT. Therefore, electric current for driving the solenoid valves V1, V2 is controlled by the electronic control device CT based upon the signals from the respective sensors and switches. The controlled electric current is supplied to each solenoid valve V1, V2 via the output interface OT and each driving circuit AO. The electric motor M is also operatively connected to the electronic control device CT. Control signals are outputted from the output interface OT to the electric motor M via a driving circuit AO so that the electric motor M is controlled by the electronic control device CT. The ROM memorizes programs corresponding to the flow charts illustrated in FIGS. 3–7. The CPU performs the programs while the ignition switch is ON. In addition, the RAM temporarily memorizes variable data required to perform the programs.

A set of processes or programs for performing the automatic brake control is performed by the electronic control device CT. When the ignition switch is ON, predetermined programs are commenced or initiated by the microcomputer CM. According to this described embodiment, a correcting process for correcting the electric current applied to the solenoid valves V1, V2 is performed as a part of the automatic brake control. That is, when electric current is applied to the solenoid valves V1, V2 with the hydraulic pressure control valve device HC interrupting communication between the master cylinder MC and the wheel brake cylinder WC when the vehicle engine is activated and the brake pedal BP is not operated, the master piston MP is activated by the hydraulic pressure outputted from the auxiliary hydraulic pressure source AS. The master cylinder hydraulic pressure discharged from the master cylinder MC under the above condition is detected by the pressure sensor P2 and is compared with a predetermined reference hydraulic pressure. The electric current applied to the solenoid valves V1, V2 is corrected based upon the result of the comparison.

The predetermined programs performed by the microcomputer CM are described below with reference to the flow charts illustrated in FIGS. 3–7. Referring to the general flow chart illustrated in FIG. 3, the microcomputer CM is first initialized at step 101 to clear various calculated values. At step 102, the signals outputted from the pressure sensors P1, P2, the vehicle wheel speed sensor WS, the brake switch SS, and the automatic brake switch AB are received by the microcomputer CM to perform an input process. For example, the master cylinder hydraulic pressure Pm is determined based upon a signal detected by the pressure sensor P2. The program then proceeds to step 103 to calculate an estimated vehicle speed Vs (hereinafter, referred to as a vehicle speed Vs) based upon a vehicle wheel rotating speed detected by the vehicle wheel speed sensor WS. The program then proceeds to step 104 to differentiate the vehicle speed Vs and to calculate an estimated vehicle acceleration DVs (hereinafter, referred to as a vehicle acceleration DVs).

At step 105, the microcomputer CM determines whether or not the linear solenoid valves V1, V2 are normally operating. When the valves V1, V2 are normally operating, the program proceeds to step 106 to perform the automatic brake control. Generally well-known automatic brake controls include braking force control to maintain a constant vehicle distance with respect to a vehicle running ahead and the braking force control for maintaining a constant vehicle speed when the vehicle is running on a down-hill. With respect to the brake control for maintaining a vehicle distance towards the vehicle running ahead, the speed or acceleration of the vehicle running ahead, and the like are determined or calculated, for example by using a laser or by an image recognizing device. A target hydraulic pressure is then calculated for maintaining a constant vehicle distance towards the vehicle running ahead based upon the calculated values. Therefore, the brake hydraulic pressure supplied to the wheel brake cylinder WC is controlled.

In the case of the brake control for maintaining a constant vehicle speed, the target hydraulic pressure is calculated to control the vehicle speed Vs of a vehicle running on a down-hill so that it correspond to a target vehicle speed by a switching operation of the automatic brake switch AB by the driver. Therefore, the brake hydraulic pressure supplied to the wheel brake cylinder WC is controlled.

Figure 7:
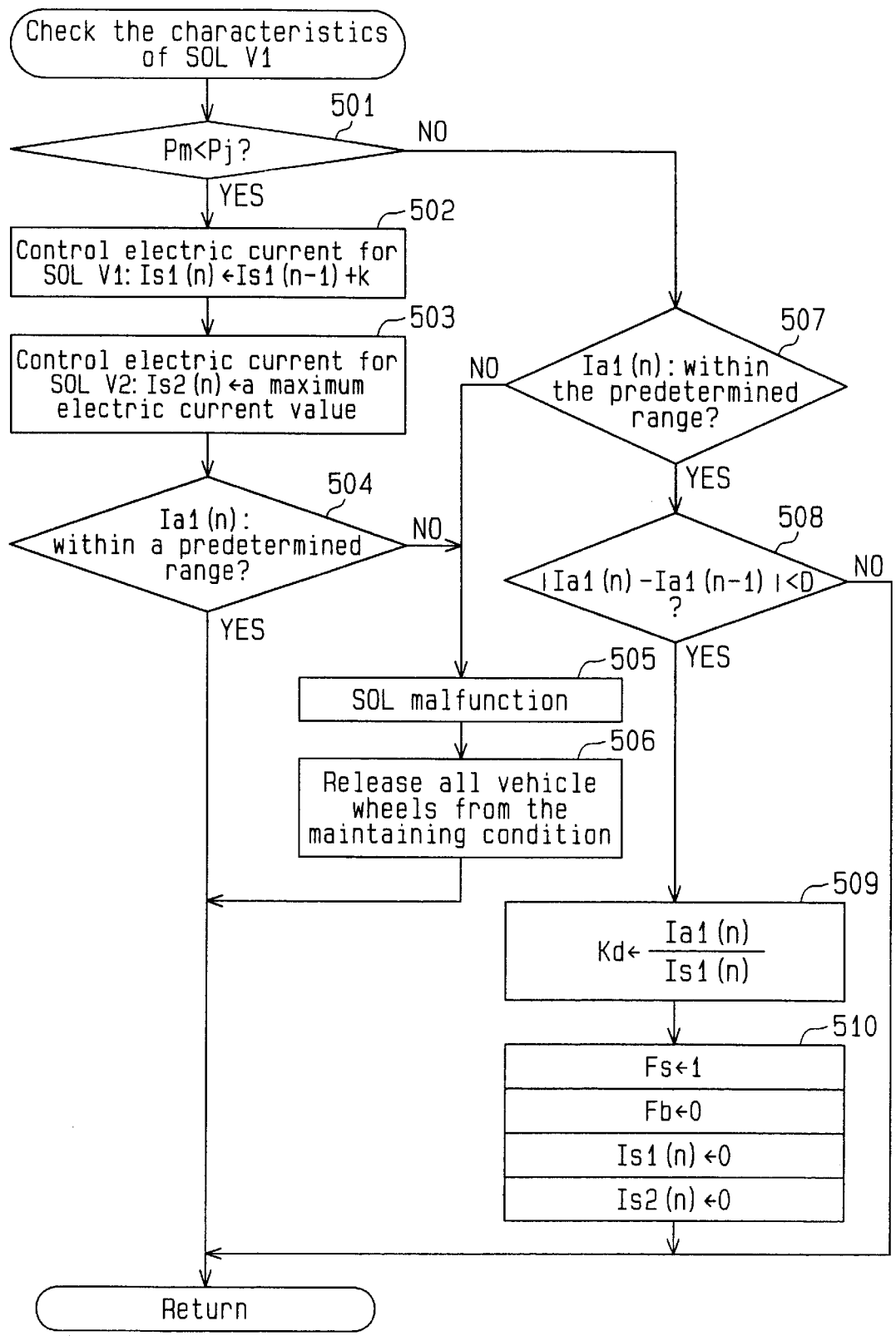
FIG. 7 is a flow chart showing a process for step 309 in FIG. 5 involving checking the characteristics of the linear solenoid valve V1.
Figure 8:
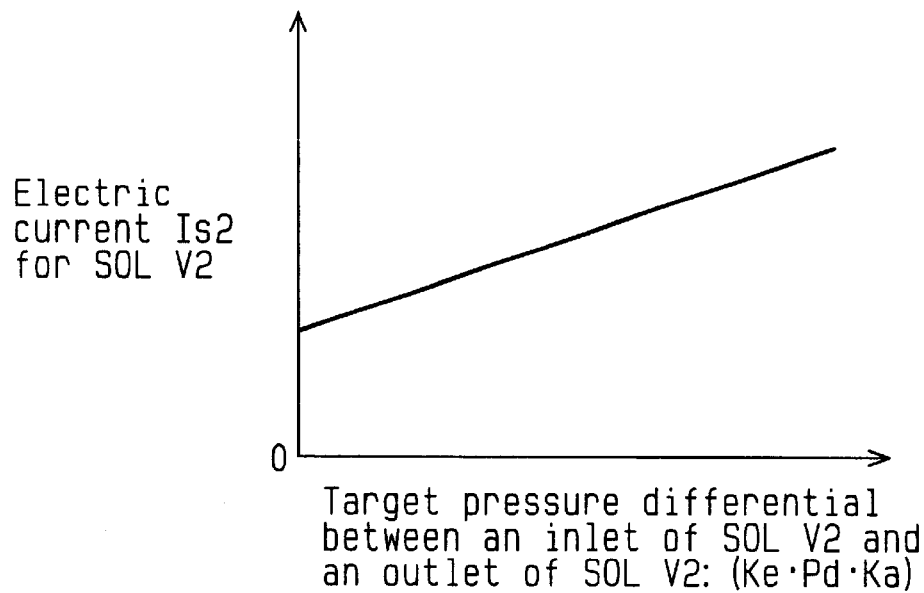
FIG. 8 is a graph illustrating an example of a map for determining electric current supplied to the linear solenoid valve V2.

At step 107, the microcomputer CM determines whether or not a check for characteristics is allowed to be performed. The program then proceeds to step 108 where the check for the characteristics is performed. Details associated with the operations carried out in steps 107 and 108 are illustrated in FIGS. 7 and 8 respectively and are described below in more detail. At step 108, aging distortions and temperature variations of the linear solenoid valves V1, V2 are checked to correct the electric current applied to the solenoid valves V1, V2. Therefore, a predetermined master cylinder hydraulic pressure can be ensured with relatively no affect by such variations. According to this embodiment, the check for the characteristics can be performed when the vehicle engine is activated and the brake pedal BP is not operated. The program then proceeds to step 109 to determine whether or not the automatic brake control has been performed. If the automatic brake control has been performed, the program proceeds to steps 110 and 111.

At step 110, an electric current Is2 for activating the solenoid valve V2 is determined based upon a map illustrated in FIG. 8 corresponding to a target pressure differential (Ke·Pd·Ka) between the inlet of the solenoid valve V2 and the outlet of the solenoid valve V2 relative to a pressure differential between the inlet of the solenoid valve V2 and the outlet of the solenoid valve V2. Hereinafter, "Pd" designates a target master cylinder hydraulic pressure, "Ke" designates a coefficient for converting the target master cylinder hydraulic pressure into a hydraulic pressure to be inputted to the regulator RG, and "Ka" designates a correcting coefficient for checking the linear solenoid valve V2.

Figure 9:
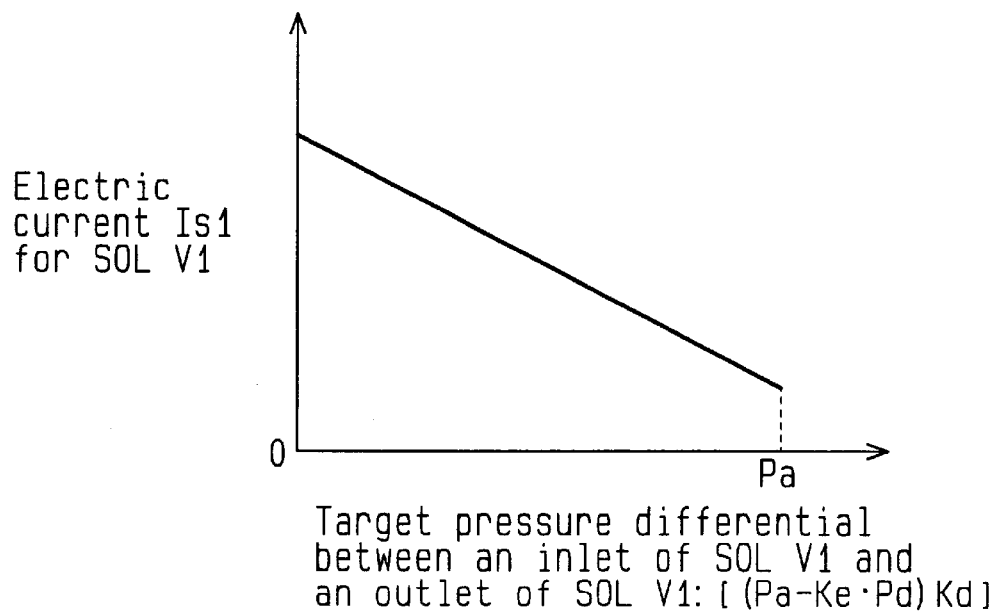
FIG. 9 is a graph illustrating an example of a map for determining electric current supplied to the linear solenoid valve V1.

At step 111, an electric current Is1 for activating the solenoid valve VI is determined based upon the map illustrated in FIG. 9 corresponding to a target pressure differential (Pa·Ke·Pd) Kd between the inlet of the solenoid valve V1 and the outlet of the solenoid valve V1. Hereinafter, "Pa" designates an accumulator hydraulic pressure and "Kd" designates a correcting coefficient for checking the linear solenoid valve V1. The correcting coefficients "Ka" and "Kd" are set at "1" before the checking for the characteristics is performed and are corrected at step 108 when the checking for the characteristics is performed.

On the other hand, when the microcomputer CM determines at step 105 that the solenoid valves V1, V2 are experiencing a malfunction for some reason, the program proceeds to step 112 to not allow the automatic brake control. At step 113, data associated with the check for the characteristics is initialized. The program then proceeds to step 114 to clear the electric current Is (representing the electric current Is1 and Is2) to zero so that each solenoid valve V1, V2 is returned to its respective initial position illustrated in FIG. 1. Further, when the program determines at step 109 that the automatic brake control has not been performed, the program proceeds to step 114 to clear the electric current Is to zero.

Figure 3:
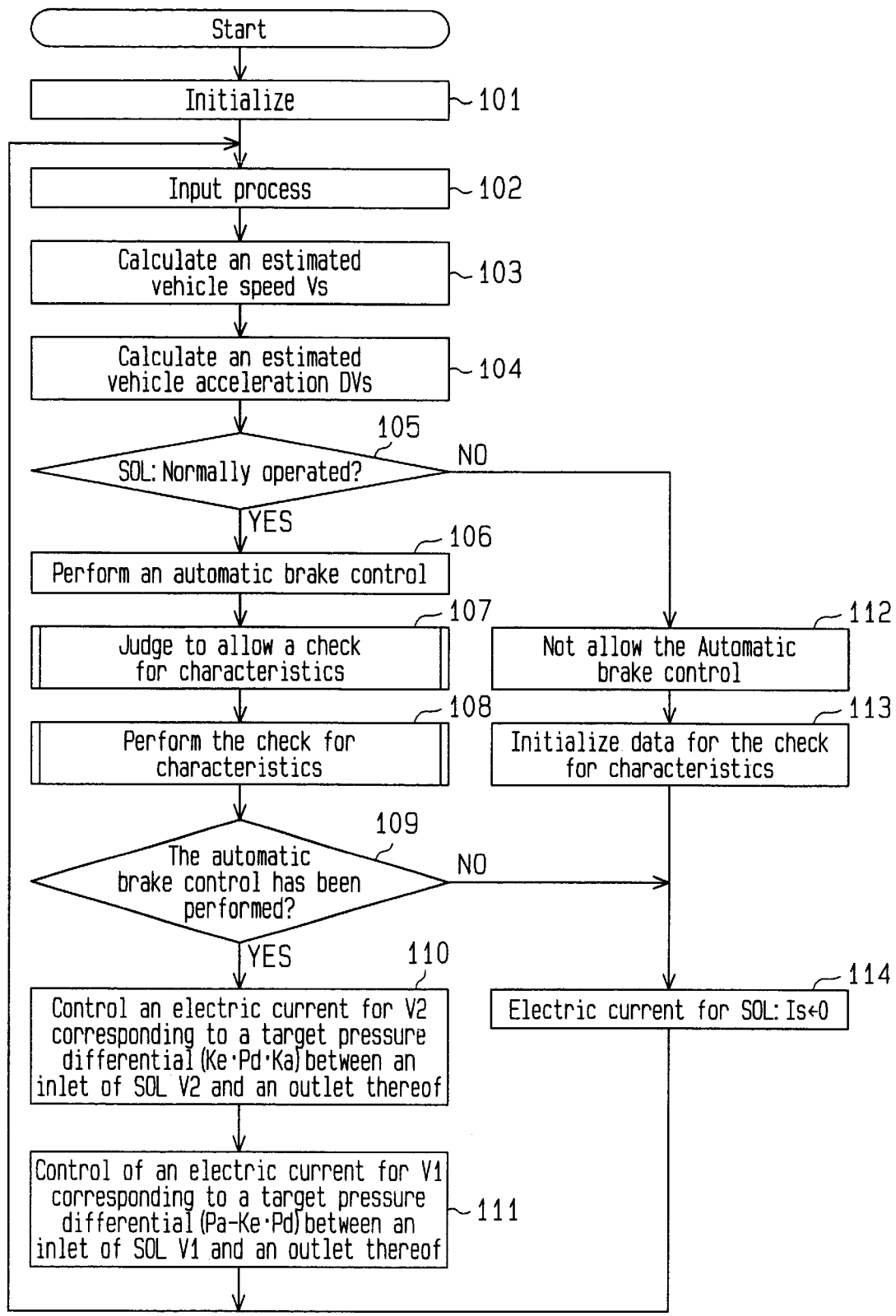
FIG. 3 is a general flow chart showing a program for performing brake hydraulic control according to the embodiment of the present invention.
Figure 4:
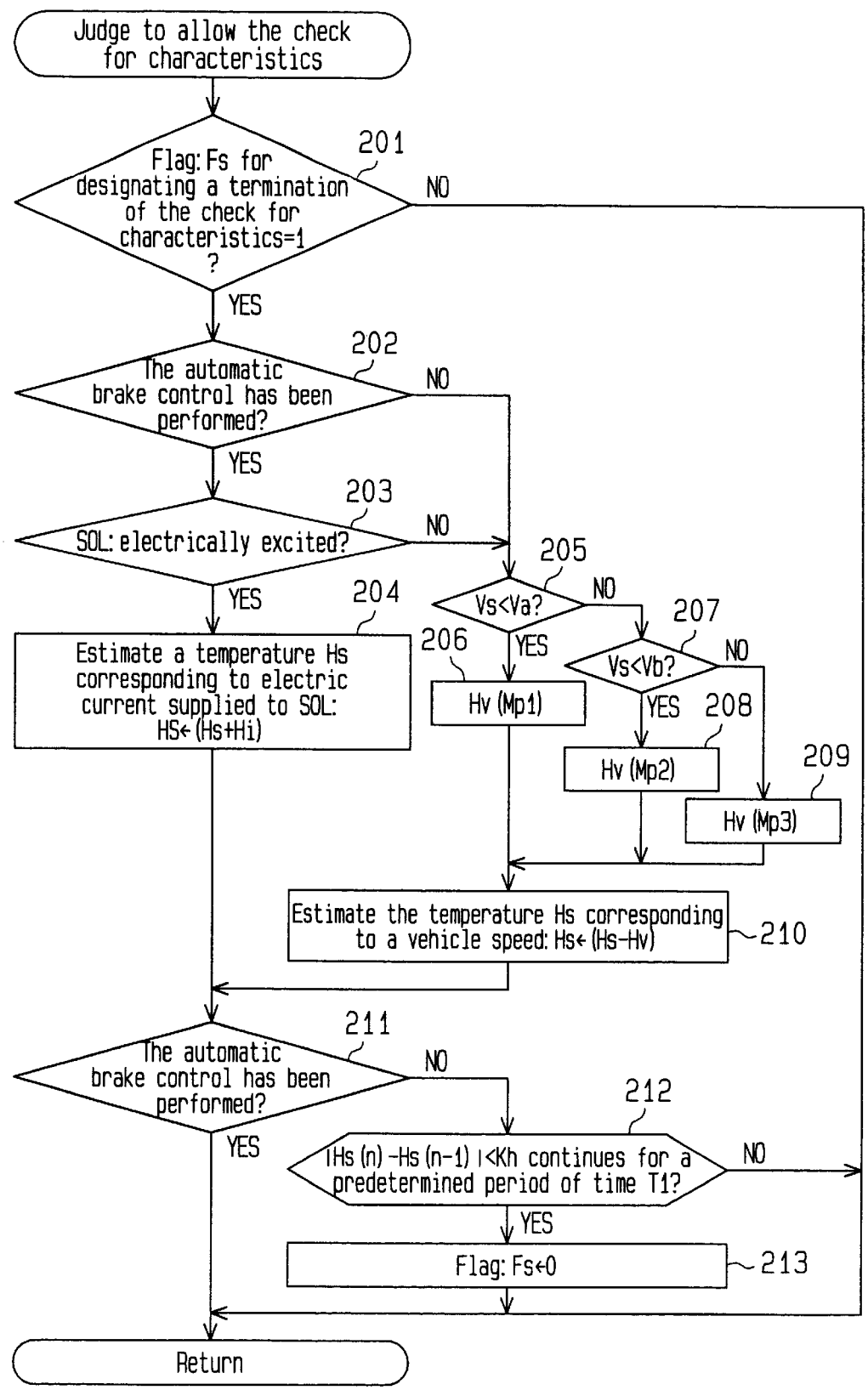
FIG. 4 is a flow chart showing a sub-routine for step 107 in FIG. 3 involving determining whether or not a check for characteristics is allowed to be performed.

The program shown by the flow chart illustrated in FIG. 4 is a sub-routine performed to determine whether or not the conditions for performing the check for the characteristics are satisfied in accordance with step 107 of the flow chart shown in FIG. 3. When the conditions are satisfied, the check for the characteristics is performed as described later with reference to FIG. 5. On the other hand, when the check for the characteristics has not been performed, the variations of the temperature characteristics of the solenoid valves V1, V2 are monitored. If the variations of the temperature characteristics are small and are substantially stable, the check for the characteristics is performed with reference to the flow chart illustrated in FIG. 5.

At step 201, the microcomputer CM determines whether or not a flag Fs has been set to be "1". The flag Fs designates that the check for the characteristics of the solenoid values V1, V2 was completed. If the flag Fs has not been set to be "1", the program returns to the main routine illustrated in FIG. 3. When the flag Fs has been set to be "1", the program proceeds to step 202 to determine whether or not the automatic brake control has been performed. When the automatic brake control has been performed, the program further proceeds to step 203 so as to determine whether or not the linear solenoid valve V1 (or the linear solenoid valve V2) has been electrically excited or energized. When the linear solenoid valve V1 has been electrically excited, an increasing temperature of the solenoid valve V1 can be estimated corresponding to an electric current value Is1($n$) at this time.

Figure 10:
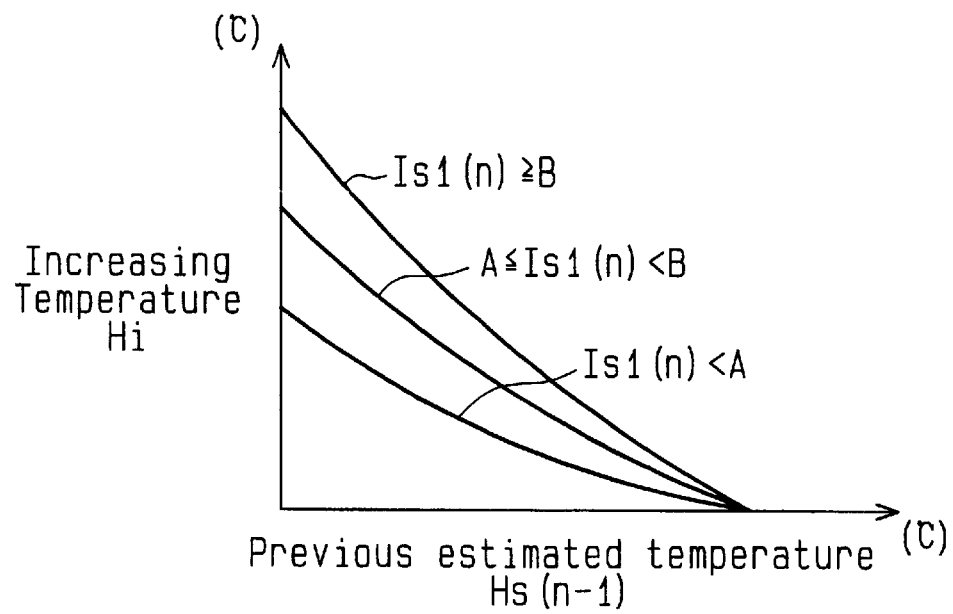
FIG. 10 is a graph illustrating an example of a map for estimating an increasing temperature of the linear solenoid valves V1 and V2.

That is, the increasing temperature of the solenoid valve V1 corresponds to an increase of the actual electric current value Is1(n). An estimated value of the increasing temperature is set as illustrated in FIG. 10 based upon a previous estimated temperature Hs(n−1). In other words, the temperature characteristics corresponding to the actual electric current value Is1(n) is memorized as a map. According to a graph illustrated in FIG. 10, "A" and "B" are predetermined values and "A" is always smaller than "B". Any one of the temperature characteristics is selected corresponding to the actual electric current value Is1(n) based upon the map illustrated in FIG. 10 so that an increasing temperature Hi of the solenoid valve V1 cw be estimated. Therefore, at step 204, an updated estimated temperature Hs is determined by adding the increasing temperature Hi to an estimated temperature Hs of the linear solenoid valve V1 (or the linear solenoid valve V2).

Figure 11:
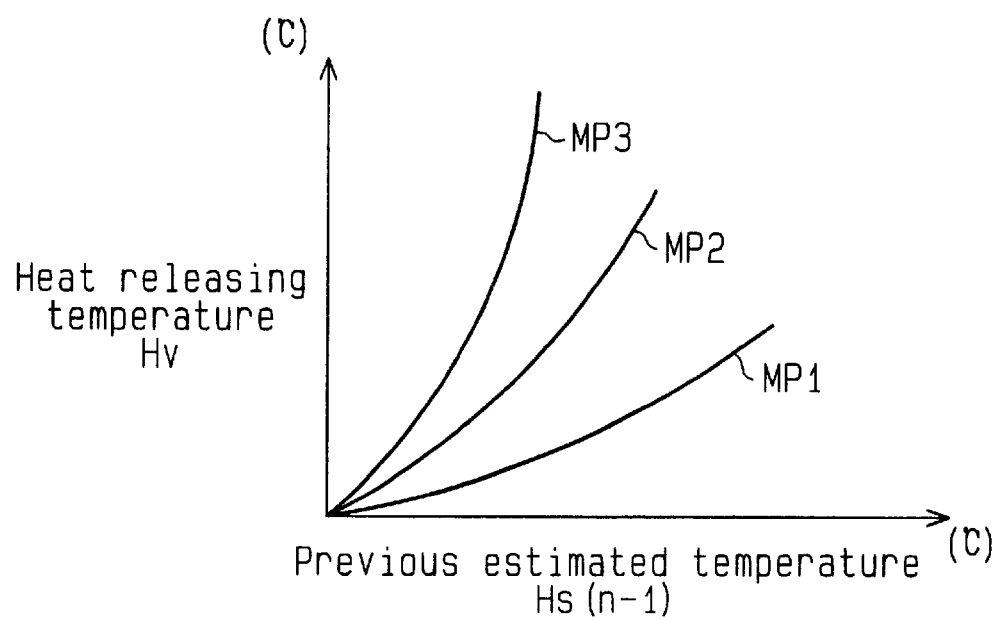
FIG. 11 is a graph illustrating an example of a map for estimating a heat releasing temperature of the linear solenoid valves V1 and V2.

On the other hand, when the microcomputer CM determines at step 202 that the automatic brake control has not been performed, or when the microcomputer CM determines at step 203 that the solenoid valve V1 (or the solenoid valve V2) has not been electrically excited, the program proceeds to step 205 to estimate a heat releasing temperature corresponding to the vehicle speed Vs. That is, the linear solenoid valve V1 (or the linear solenoid valve V2) is cooled down with air and releases heat corresponding to an increase of the vehicle speed Vs. An estimated value of the heat releasing temperature is set as illustrated by the graph in FIG. 11 so as to be memorized as a map. According to the above described map, any one of several characteristics, MP1 (for a low speed), MP2 (for a middle speed) and MP3 (for a high speed), is selected corresponding to the vehicle speed Vs. Therefore, a heat releasing temperature Hv can be estimated based upon the previous estimated temperature Hs(n−1) of the linear solenoid valve V1 (or V2).

At step 205 in FIG. 4, the vehicle speed Vs is compared with a minimum reference speed Va. When the vehicle speed Va is below the reference speed Va, the program proceeds to step 206 to select the characteristic MP1 for the low speed. Based upon the characteristic MP1, a heat releasing temperature Hv (MP1) is estimated corresponding to the previous estimated temperature Hs(n−1). When the vehicle speed Vs is equal to or above the reference speed Va, the program proceeds to step 207 to compare the vehicle speed Vs with a reference speed Vb (Va<Vb). When the vehicle speed Vs is below the reference speed Vb, the characteristic MP2 for the middle speed is selected at step 208. Therefore, a heat releasing temperature Hv (MP2) is estimated corresponding to the previous estimated temperature Hs(n−1). When the vehicle speed Vs is equal to or above the reference speed Vb, the characteristic MP3 for a high speed is selected at step 209. Therefore, a heat releasing temperature Hv(MP3) is estimated corresponding to the previous estimated temperature Hs(n−1). Therefore, an updated estimated temperature Hs is determined at step 210 by subtracting the heat releasing temperature Hv (represented by Hv(MP1), Hv(MP2) or Hv(MP3)) from the estimated temperature Hs of the solenoid valve V1 (or the solenoid valve V2).

As described above, the estimated temperature Hs of the solenoid valve V1 (or the solenoid vale V2) is updated at step 204 or at step 210. The updated estimated temperature Hs is set as an estimated temperature Hs(n) at this time. At step 212, a difference between the previous estimated temperature Hs(n−1) and the estimated temperature Hs(n) at this time is calculated. The difference means a variation every calculating cycle.

When the microcomputer CM determines at step 211 that the automatic brake control has not been performed, the program proceeds to step 211 where the microcomputer CM determines whether or not an absolute value of the difference (Hs(n)−Hs(n−1)) is below or less than a predetermined value Kh for a predetermine period time T1. That is, the microcomputer CM determines whether or not temperature variations of the linear solenoid valve V1 (or the linear solenoid valve V2) are within a predetermined range and the temperature variations are substantially stable. When the temperature variations are stable (i.e., when the absolute value of the difference (Hs(n)−Hs(n−1)) is less than the predetermined value Kh for a predetermine period time T1), the program proceeds to step 213 to reset the flag Fs at zero. Therefore, the check for the characteristics is performed following to the flow chart illustrated in FIG. 5. Further, when the microcomputer CM determines at step 211 that the automatic brake control has been performed, when the answer at the step 212 is NO or when the linear solenoid valve V1 (or the linear solenoid valve V2) is not stable, the program returns to the main routine illustrated in FIG. 3 with the flag Fs set at "1". In such a case, the check for the characteristics according to the FIG. 5 flow chart is not performed at step 108.

Figure 5:
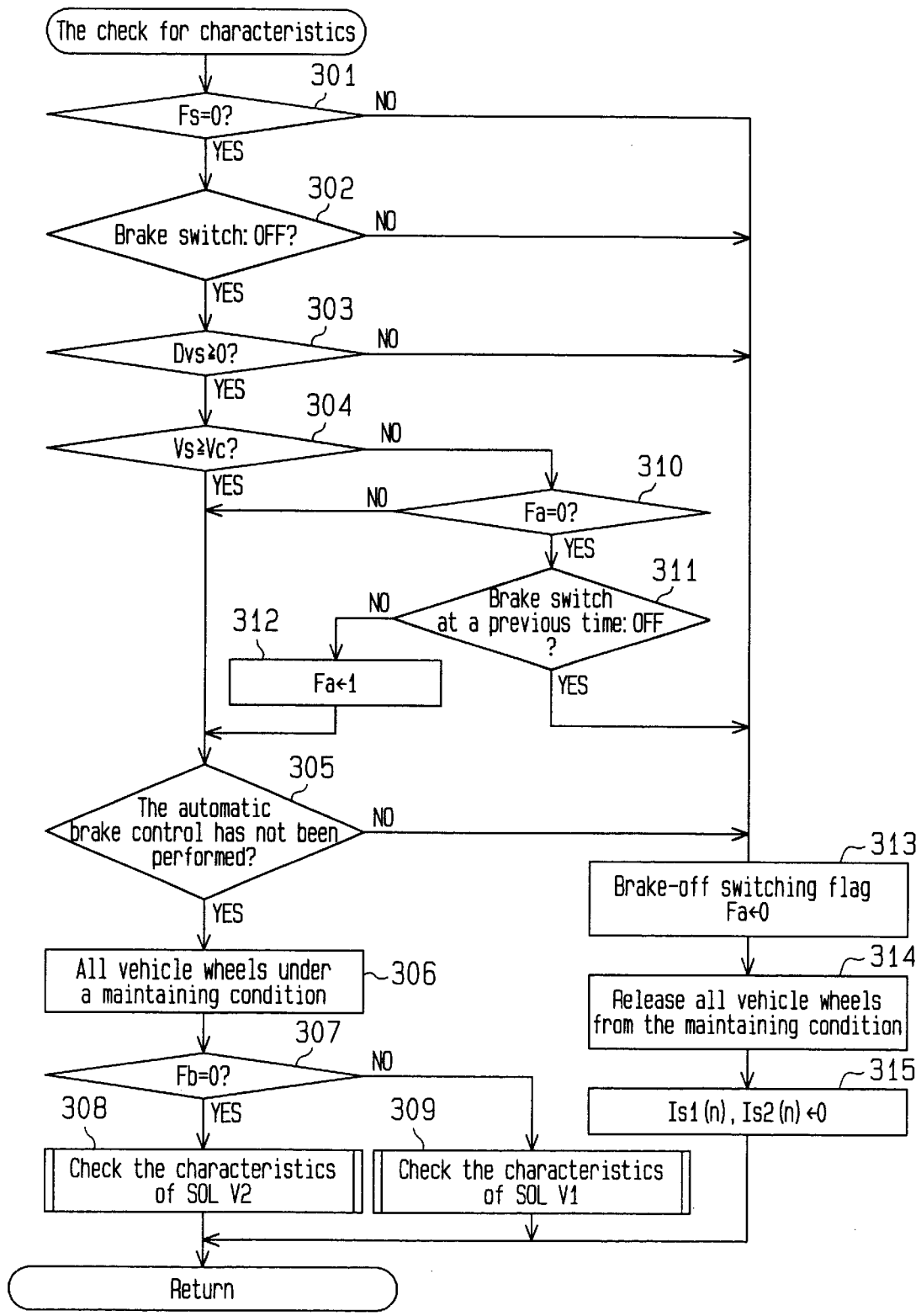
FIG. 5 is a flow chart showing a sub-routine for step 108 in FIG. 3 involving performing the check for characteristics.

Referring to the process for performing the check for the characteristics illustrated in FIG. 5, the microcomputer CM first determines at step 301 whether or not the flag Fs is set at zero. That is, the microcomputer CM determines at step 301 whether or not the check for the characteristics of the linear solenoid valve V2 was completed. Only when the flag Fs is set at zero does the program proceed to step 302. When the flag Fs is set at "1", the program proceeds to step 313 without performing the check for the characteristics. At step 302, the microcomputer CM judges the condition of the brake switch BS. When the brake pedal BP is not operated and the brake switch BS is OFF, the program proceeds to step 303 to determine whether or not the vehicle acceleration DVs is equal to or greater than zero, i.e. to determine whether or not the vehicle has been accelerated or has been running at a constant speed. When the vehicle has been accelerated at a speed equal to or greater than zero or has been running at a constant speed, the program proceeds to step 304 to allow the check for the characteristics at subsequent steps. On the other hand, when the vehicle has been decelerated, for example when the engine brake has been performed, there is a high possibility that the brake pedal BP is operated immediately. Therefore, the program proceeds to step 313 so as not to allow the check for the characteristics.

At step 304, the vehicle speed Vs is compared with a predetermined speed Vc. When the microcomputer CM determines that the vehicle speed Vs is equal to or greater than the predetermined speed Vc, the program further proceeds to step 305. On the other hand, when the vehicle speed Vs is below the predetermined speed Vc, the program proceeds to step 310. The microcomputer CM determines at step 305 whether or not the automatic brake control has been performed. When the automatic brake control has not been performed, the program proceeds to step 306 to perform the check for the characteristics. That is, at step 306, the communications between the master cylinder MC and the wheel brake cylinders WC for all of the vehicle wheels are interrupted by the hydraulic pressure control valve device HC. Therefore, the wheel brake cylinder hydraulic pressure for all of the vehicle wheels is under a maintaining condition.

Under the above-described condition, the program further proceeds to step 307 to determine whether or not a flag Fb has been reset at zero. The flag Fb designates that the check for the characteristics of the linear solenoid valve V2 was completed. When the flag Fb has been reset at zero, i.e. when the check for the characteristics of the linear solenoid valve V2 has not been completed yet, the program proceeds to step 308 to check the characteristics of the linear solenoid valve V2. On the other hand, when it is determined at step 307 that the flag Fb has been set at "1", i.e. when the check for the characteristics of the linear solenoid valve V2 has been completed already, the program proceeds to step 309 to check the characteristics of the linear solenoid valve VA. The checks for the characteristics of the solenoid valves V1, V2 in steps 308, 309 are described later with reference to FIGS. 6 and 7.

When it is determined at step 304 that the vehicle speed Vs is below the predetermined speed Vc, the program proceeds to step 310 to determine whether or not a brake-off switching flag Fa is set at zero. When the brake-off switching flag Fa is set at "1" at the step 310, the program proceeds to step 305. On the other hand, when it is determined at step 310 that the flag Fa is set at zero, the program proceeds to step 311 to determine whether or not the brake switch BS was OFF at a previous stage. When the microcomputer CM determines that the brake switch BS was ON at the previous stage, it means that the brake switch BS was switched from ON to OFF so that the brake-off switching flag Fa is set at "1" at step 312. The program then proceeds to step 305.

When the program determines at step 311 that the brake switch BS was OFF at the previous stage, the program proceeds to step 313 to reset the brake-off switching flag Fa to zero. The program further proceeds to step 314 to release the wheel brake cylinder hydraulic pressure for all the vehicle wheels from the maintaining condition. That is, the communications between the master cylinder MC and all the wheel brake cylinders WC is reestablished by the hydraulic pressure control valve device HC. The check for the characteristics is ultimately completed by setting the electric current $Is1(n)$ of the linear solenoid valve V1 and the electric current $Is2(n)$ of the linear solenoid valve V2 at zero.

The program also proceeds to step 313 when the program determines at step 302 that the brake switch BS is ON at this time, when the program determines at step 303 that the vehicle has been decelerated so that the vehicle acceleration Dvs is below zero, and when the program determines at step 305 that the automatic brake control has been performed. As described above, at step 313, the brake-off switching flag Fa is reset at zero. Then, at step 314, the wheel brake cylinder hydraulic pressure for all of the vehicle wheels is released from the maintaining condition. Then at step 315, the electric current $Is1(n)$ of the solenoid valve V1 and the electric current $Is2(n)$ of the solenoid valve V2 are set at zero.

Figure 6:
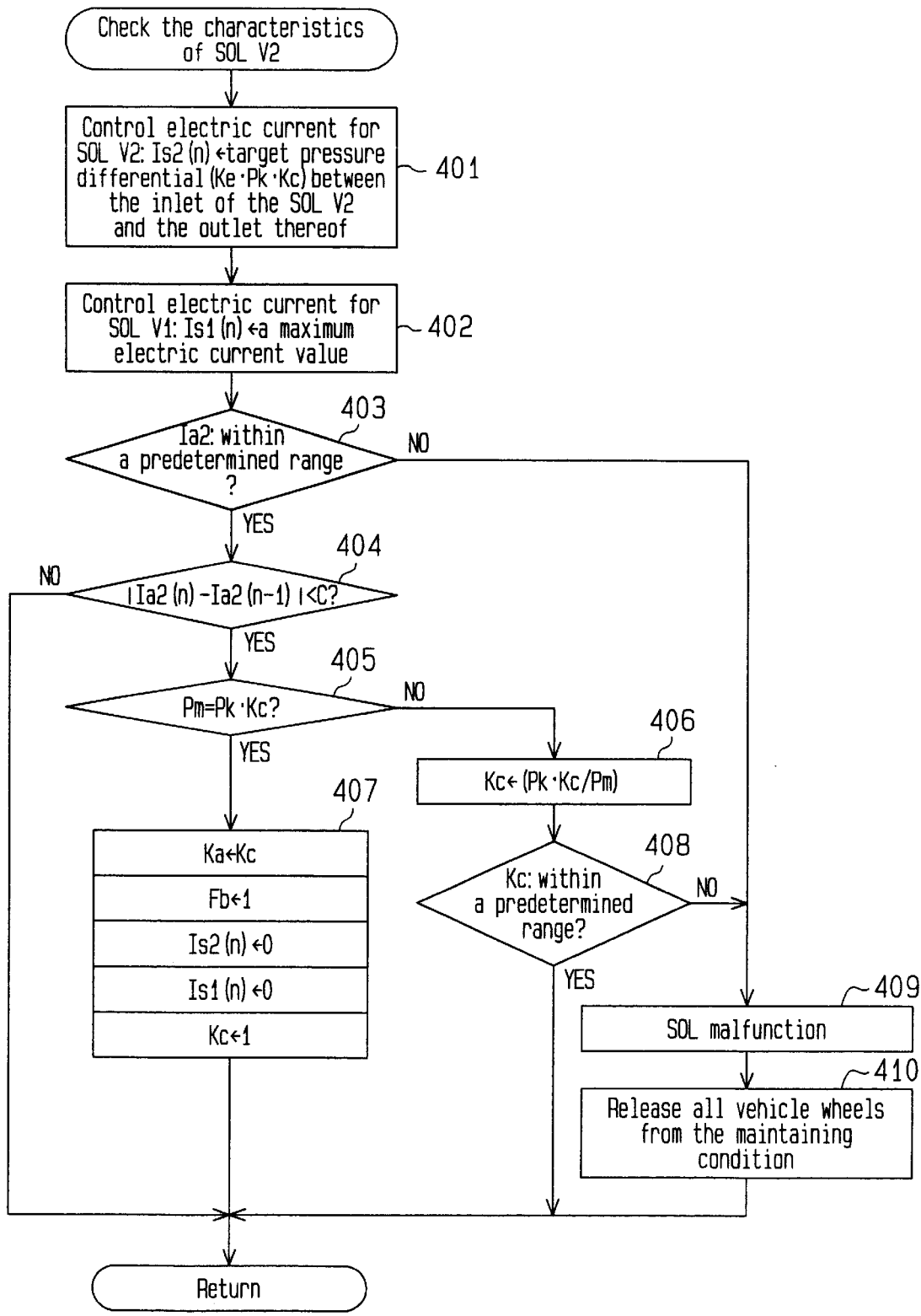
FIG. 6 is a flow chart showing a process for step 308 in FIG. 5 involving checking the characteristics of the linear solenoid valve V2.

The flow chart illustrated in FIG. 6 shows a process for checking the characteristics of the solenoid valve V2 performed at step 308 as described above. Referring to the flow chart illustrated in FIG. 6, the electric current $Is2(n)$ for activating the solenoid valve V2 is determined at step 401 following the map illustrated in FIG. 8 based upon a target pressure differential (Ke·Pk·Kc) between the inlet of the solenoid valve V2 and the outlet of the solenoid valve V2 corresponding to a predetermined master cylinder hydraulic pressure Pk for checking the linear solenoid valve V2. The determined electric current $Is2(n)$ is supplied to the linear solenoid valve V2. "Kc" designates a correcting coefficient for checking the linear solenoid valve V2. The correcting coefficient Kc is employed to prevent a correcting coefficient from being deleted when the process for performing the check for the characteristics is stopped halfway and is employed until an ultimate correcting coefficient Ka is determined. An initial value of the coefficient Kc is set at "1". At step 402, the electric current $Is1(n)$ for the linear solenoid valve V1 is set at a maximum electric current and is outputted to the linear solenoid valve V1.

The program then proceeds to step 403 to determine whether or not an electric current $Ia2(n)$ actually supplied to the solenoid valve V2 is within a predetermined range. When the actually supplied electric current $Ia2(n)$ is within the predetermined range, the program further proceeds to step 404 to determine whether or not the absolute value of a variation of the actually supplied electric current $|Ia2(n)-Ia2(n-1)|$ is below a predetermined value. That is, when the microcomputer CM determines at step 404 that the absolute value of the variation of the actually supplied electric current $|Ia2(n)-Ia2(n-1)|$ is below a predetermined value C and the variation is substantially stable, the program proceeds to step 405 to compare the master cylinder hydraulic pressure Pm with a pressure (Pk·Kc). When the master cylinder hydraulic pressure Pm does not correspond to the pressure (Ph·Kc), the program proceeds to step 406 to correct the correcting coefficient Kc to meet a coefficient (Pk·Kc/Pm). On the other hand when the microcomputer CM determines at step 405 that the master cylinder hydraulic pressure corresponds to the pressure (Pk·Kc), the program proceeds to step 407. At step 407, the ultimate correcting coefficient Ka is set at the correcting coefficient Kc, the flag Fb is set at "1", the electric current $Is1(n)$ and the electric current $Is2(n)$ are set at zero, and the correcting coefficient Kc is set at "1".

Further, when the microcomputer CM determines at step 403 that the electric current $Ia2(n)$ actually supplied to the solenoid valve V2 is beyond or outside the predetermined range due to disconnection, short circuit, or the like, or when the microcomputer CM determines at step 408 that the correcting coefficient Kc is beyond or outside the predetermined range, the program proceeds to step 409 from step 403 or from step 408. Here, a malfunction of the solenoid valve V2 is determined. The program then proceeds to step 410 to release the wheel brake cylinder hydraulic pressure for all of the vehicle wheels from the maintaining condition. That is, communication between the master cylinder MC and each of the wheel brake cylinders WC is reestablished by the hydraulic pressure control valve device HC.

The flow chart illustrated in FIG. 7 shows the process for checking the characteristics of the solenoid valve V1 performed at step 309 in FIG. 5. Referring to the flow chart illustrated in FIG. 7, the microcomputer CM determines at step 501 whether or not the master cylinder hydraulic pressure Pm has reached a predetermined master cylinder hydraulic pressure Pj for checking the linear solenoid valve V1. When the master cylinder hydraulic pressure Pm is below or less than the master cylinder hydraulic pressure Pj, the program proceeds to step 502. Here, the electric current $Is1(n)$ for the solenoid valve V1 is set at a value in which a predetermined electric current value k is added to the previous electric current $Is1(n-1)$. The newly set electric current is supplied to the linear solenoid valve V1. At step 503, the electric current $Is2(n)$ supplied to the linear solenoid valve V2 is set at a maximum electric current value and is supplied to the linear solenoid valve V2.

At step 504 (and at step 507 described later), the microcomputer CM determines whether or not the electric current $Ia1(n)$ actually supplied to the linear solenoid valve V1 is within a predetermined range. When the electric current $Ia1(n)$ is beyond or outside the predetermined range, the program proceeds to step 505 where it is determined that the linear solenoid valve V1 is malfunctioning. The program then proceeds to step 506 to release the wheel brake cylinder hydraulic pressure for all of the vehicle wheels from the maintaining condition.

On the other hand, when the microcomputer CM determines at step 501 that the master cylinder hydraulic pressure Pm has reached the master cylinder hydraulic pressure Pj, the program proceeds to step 507 to determine whether or not the electric current Ia1($n$) actually supplied to the linear solenoid valve V1 is within the predetermined range. When the microcomputer determines at step 507 that the electric current Ia1($n$) is within the predetermined range, the program proceeds to stop 508 to determine whether or not the absolute value of a variation of the electric current |Ia1($n$)−Ia1($n-1$)| is below or less than a predetermined value D. When the absolute value is within the predetermined value D and the variation is substantially stable, the program proceeds to step 509. At step 509, the correcting coefficient Kd for the solenoid valve V1 is corrected to a value represented by (Ia1($n$)/Is1($n$)). The program further then proceeds to step 510. At step 510, the flag Fs is set at "1". The flag Fs designates that the checks for the characteristics of the solenoid valves V1, V2 were completed. Further, in step 510, the flag Fb is reset at zero, and the electric supply of electric currents Is1($n$) and Is2($n$) for the solenoid valves V1 and V2 is terminated.

Figure 12:
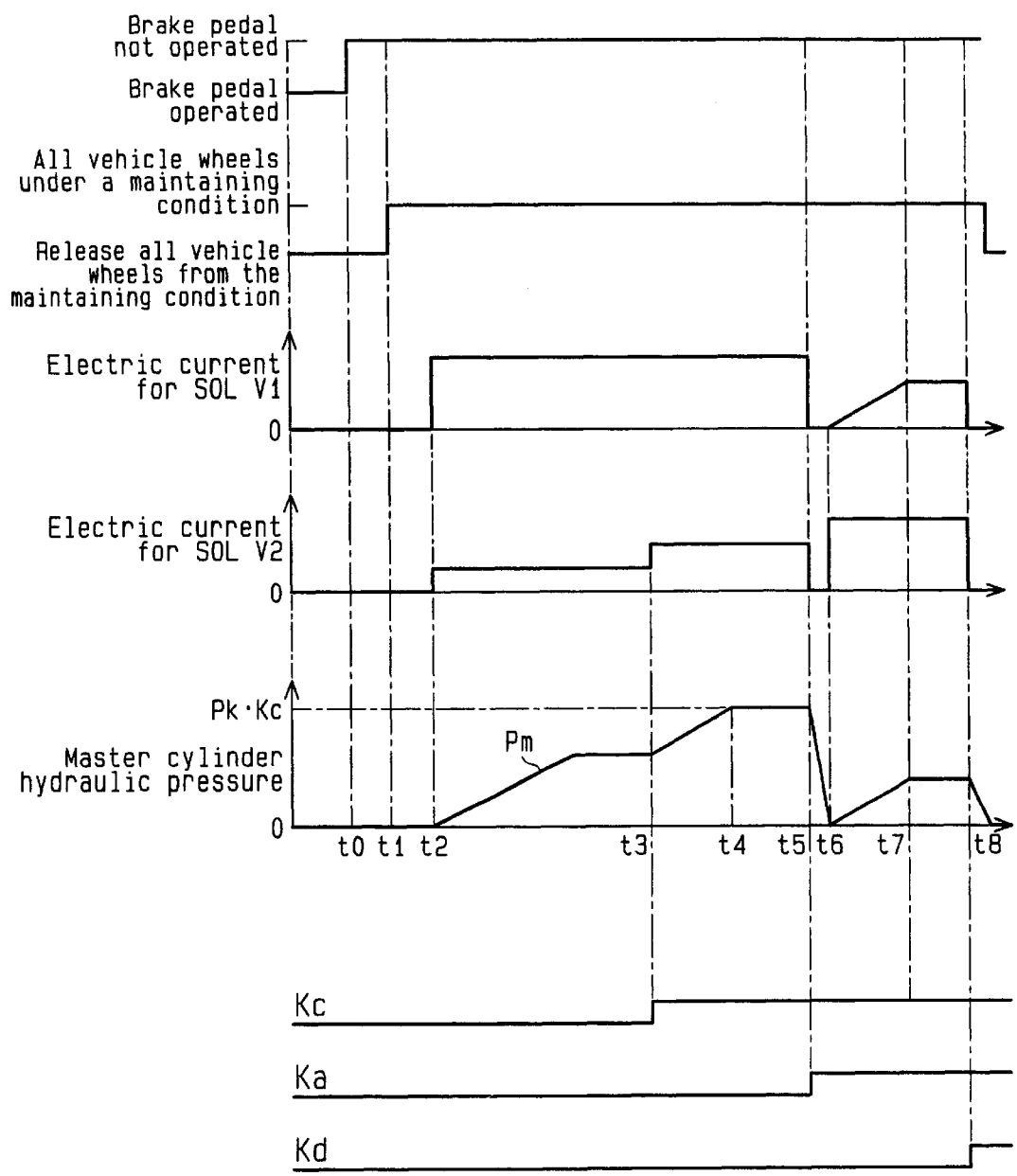
FIG. 12 is a time chart illustrating an example of a process for correcting the electric current supplied to the linear solenoid valves V1 and V2.

Referring to FIG. 12, the microcomputer CM determines at time t0 that the brake pedal BP is not under the operated condition. When predetermined starting conditions are satisfied at time t1 to commence the check for the characteristics, the wheel brake cylinder hydraulic pressure for all of the vehicle wheels becomes under the maintaining condition by the hydraulic pressure control valve device HC. The predetermined starting conditions are satisfied when the vehicle acceleration DVs is equal to or above zero, the vehicle speed Vs is equal to or above the predetermined speed Vc, and the automatic brake control has not been performed. The electric current set at the maximum electric current value is then supplied to the linear solenoid valve V1 at t2. Further, the electric current supplied to the linear solenoid valve V2 is controlled to ultimately output a target hydraulic pressure value being equal to the master cylinder hydraulic pressure Pm. Therefore, the regulator RG is controlled and the master cylinder hydraulic pressure Pm is outputted from the master cylinder MC and the amount of the outputted master cylinder hydraulic pressure Pm is gradually increased.

The master cylinder hydraulic pressure Pm outputted from the master cylinder MC is detected by the pressure sensor P2. When the master cylinder hydraulic pressure Pm does not correspond to the target hydraulic pressure value, the electric current supplied to the linear solenoid valve V2 is corrected so that the master cylinder hydraulic pressure Pm approximately meets the target hydraulic pressure value at t4. The correcting coefficient Kc is set as the ultimate correcting coefficient Ka at time t5 after a predetermined period of time T1 has passed. Thereafter, the electric current is corrected by the correcting coefficient Ka. At time t6, the electric current set at the maximum electric current value is supplied to the linear solenoid valve V2. The electric current supplied to the linear solenoid valve V1 is controlled to ultimately output the target hydraulic pressure value being equal to the master cylinder hydraulic pressure Pm. The master cylinder hydraulic pressure Pm hence meets the target hydraulic pressure value at time t7. The correcting coefficient Kc is set at the correcting coefficient Kd for the linear solenoid valve V1. The time t0 can be set when the brake switch BS is switched from ON to OFF. Also, the time t0 corresponds to the process steps from step 310 to step 312 in FIG. 5.

Next, the overall structure of the hydraulic pressure brake apparatus according to an embodiment of the present invention is described below with reference to FIGS. 13 and 14. A depressing force applied to a brake pedal 2 (corresponding to the brake pedal BP In FIG. 1) is transmitted via an input rod 3 as a brake operating force. A brake hydraulic pressure is boosted by a hydraulic pressure booster HB (corresponding to the regulator RG in FIG. 1) corresponding to the movement of the input rod 3 and is outputted from the master cylinder MC (corresponding to the master cylinder MC in FIG. 1) to the respective wheel brake cylinders mounted one each of the vehicle wheels. The overall structure of the hydraulic brake apparatus is illustrated in FIG. 13 and the hydraulic pressure booster HS positioned at an initial position is depicted in the enlarged illustration in FIG. 14.

Figure 13:
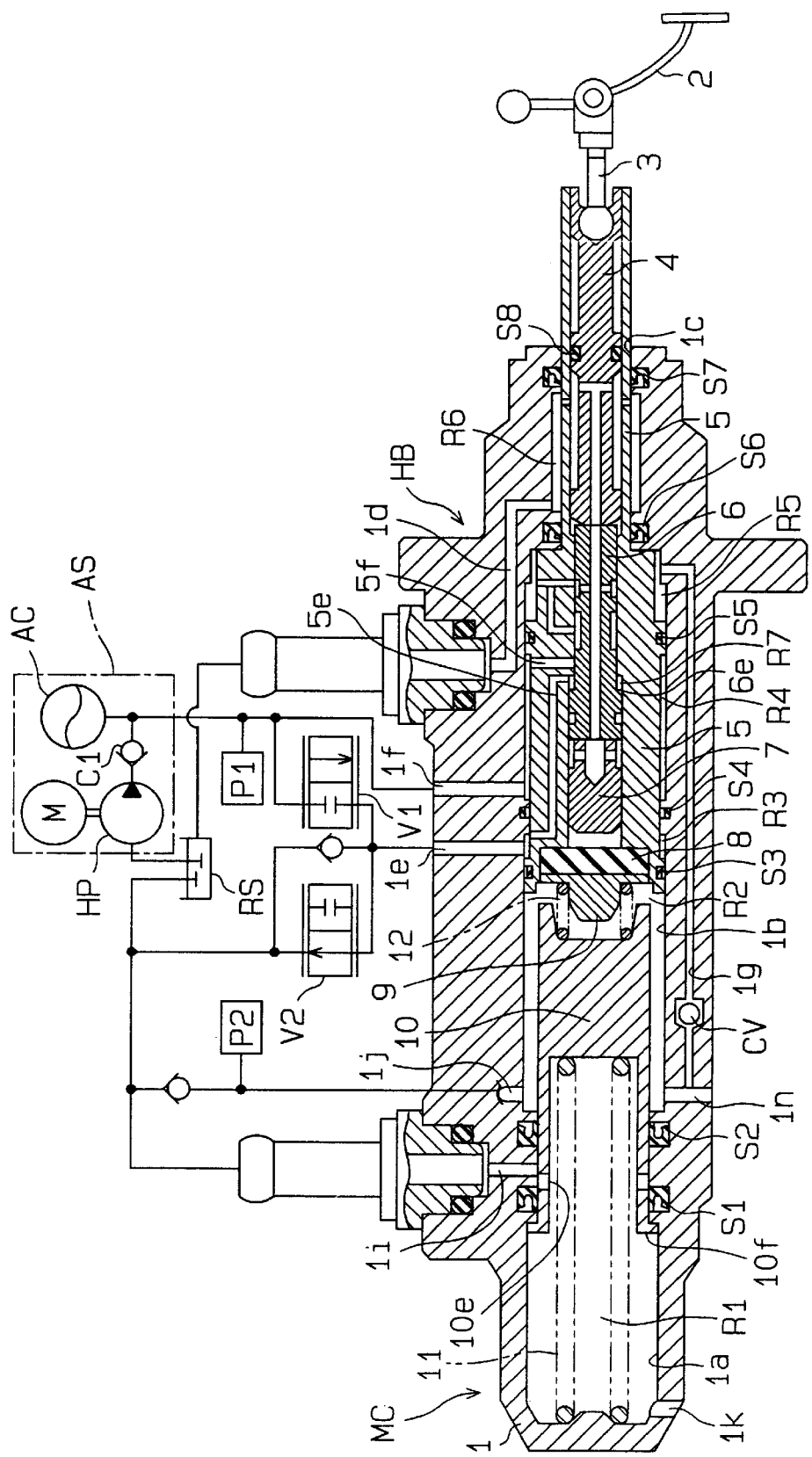
FIG. 13 is a cross-sectional view of the overall structure of the hydraulic brake apparatus according to an embodiment of the present invention.

A housing 1 forming the master cylinder MC as shown in FIG. 13 includes two cylinder bores 1a, 1b, with the diameter of the cylinder bore 1b being larger than the diameter of the cylinder bore 1a. A master piston 10 in the form of a cylindrical structure with a bottom at one end and a power piston 5 are accommodated in series in the housing 1. Two annular cup-like sealing members S1, S2 are disposed at a front side in the housing 1. The master piston 10 is hermetically and slidably supported via the sealing members S1, S2 so that a first pressure chamber A1 is defined in front of the master piston 10. The power piston 5 is disposed behind the master piston 10 in the housing 1 and is hermetically and slidably supported by an opening portion 1c defined at the rear end side of the housing 1 so that a second pressure chamber R2 is defined between the master piston 10 and the power piston 5.

Several fluid supply ports 1i, 1j, and several outlet ports 1k, 1n are defined in the housing 1. The outlet port 1k is connected to the first pressure chamber R1 and to each wheel brake cylinder mounted at each vehicle front wheel. The outlet port 1n is connected to the second pressure chamber R2 and to each wheel brake cylinder mounted at each vehicle rear wheel.

A return spring 11 is disposed between the front surface in the housing 1 and a recessed bottom portion of the master piston 10 to bias the master piston 10 in the rearward direction (i.e., to the right in FIG. 13). An engaging portion 10f is formed at the front end of the master piston 10 and is bent outwardly. The engaging portion 10f engages a stepped portion in the housing 1 to limit rearward movement of the master piston 10. When the master piston 10 is not activated and is positioned at its rearward or rear end position, the first pressure chamber R1 communicates with the reservoir RS via a communicating hole 10e which is defined at a skirt portion of the master piston 10 and via the fluid supply port 1i.

Figure 14:
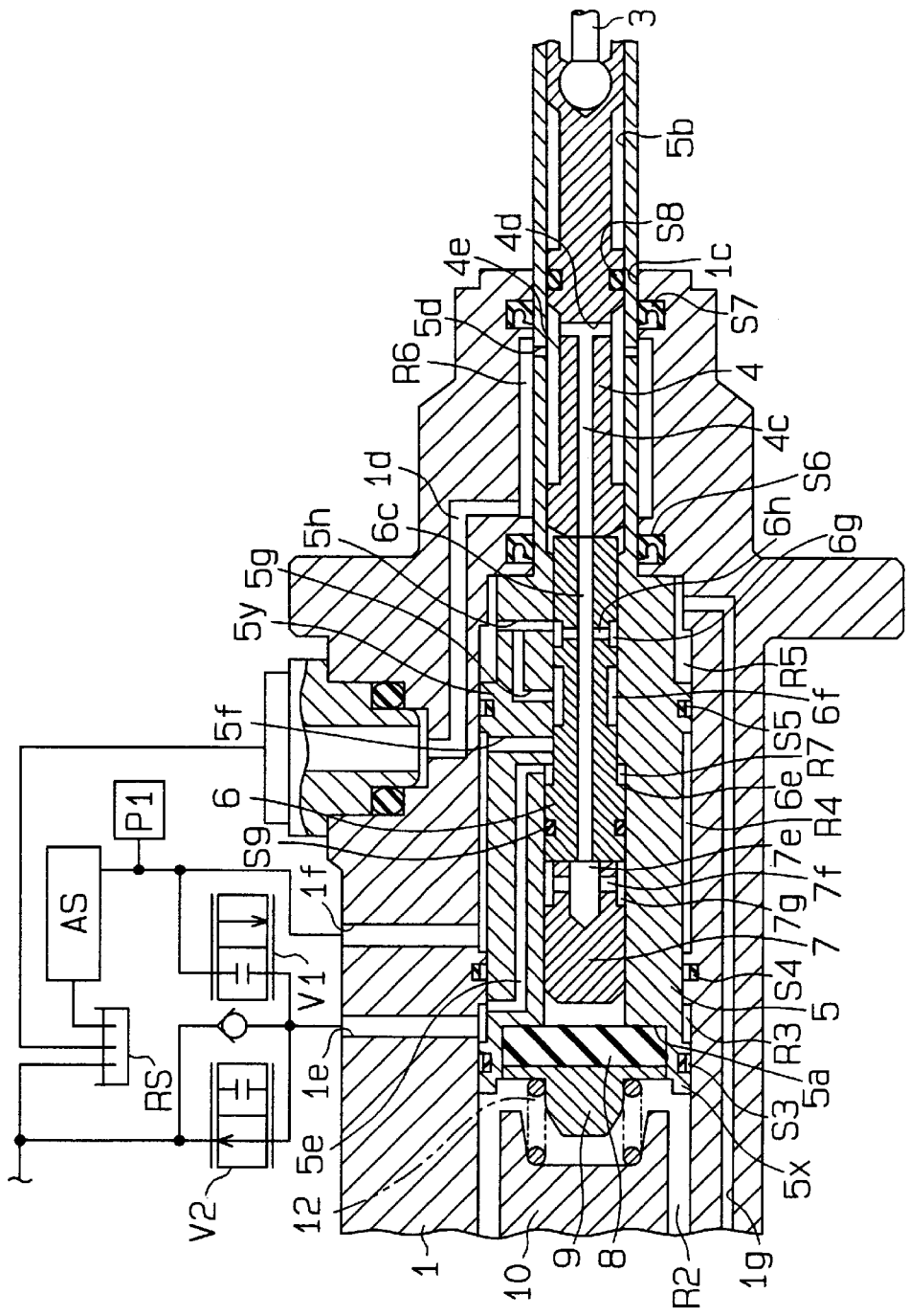
FIG. 14 is an enlarged cross-sectional view of the hydraulic pressure booster forming a part of the hydraulic brake apparatus shown in FIG. 13.

Referring to FIG. 14, a sealing member S3 is disposed in a land portion 5x formed at the front side of the power piston 5. Another sealing member S5 is disposed in a land portion 5y formed at the rear side of the power piston 5. A sealing member S4 is disposed between the sealing members S3, S5 at an inner surface of the housing 1. Further, several annular cup-like sealing members S6, S7 are disposed in a spaced apart manner with a predetermined distance therebetween at an end side in the housing 1. An annular chamber R6 is defined between the inner surface of the housing 1 between the sealing members S6, S7 and the outer surface of the power piston 5. The housing 1 is required to be shaped or constructed from a plurality of cylinders and the power piston 5 is required to be shaped or constructed from two separated members in order to dispose the sealing members S1–S7 as described above and illustrated in FIGS. 13 and 14.

However, as such arrangements are a matter of design construction, the housing 1 and the power piston 5 are described and illustrated as a single unit for purposes of simplifying the description.

In the illustrated and described embodiment of the hydraulic brake apparatus, the second pressure chamber R2 is defined between the sealing members S2, S3. In addition, an annular chamber R3 is defined between the sealing members S3, S4, an annular chamber R4 is defined between the sealing members S4, S5, and a power chamber R5 is defined between the sealing members S5, S6. A recessed portion 5a is defined at the front side of the power piston 5 and a cylindrical portion 5b with a stepped portion is defined behind or rearwardly of the recessed portion 5a in the power piston 5. A communicating hole 5e defined in the power piston 5 connects the cylindrical portion 5b with the annular chamber R3. A communicating hole 5f defined in the power piston 5 communicates with the annular chamber R4. In addition, communicating holes 5g, 5h defined in the power piston 5 communicate with the power chamber R5, while a communicating hole 5d defined in the power piston 5 communicates with the annular chamber R6.

An input member 4 is hermetically and slidably accommodated via a sealing member S8 at one end side (the rear end side) in the cylindrical portion 5b. The input rod 3 is operatively connected to an end portion of the input member 4. An axially extending communicating hole 4c defined in the input member 4 communicates with a drain port 1d via a communicating hole 4d radially defined in the input member 4, an annular groove 4e, the communicating hole 5d, and the annular chamber R6.

A spool 6 is hermetically and slidably supported via a sealing member S9 in front of the input member 4 in the cylindrical portion 5b. Further, a plunger 7 is slidably accommodated in front of the spool 6. A rubber made reaction disc 8 is disposed in the recessed portion 5a and serves as an elastic member for transmitting a reaction force. A pressure receiving member 9 is accommodated in contact with the front surface of the reaction disc 8 and is movable back and forth. A return spring 12 is disposed between the master piston 10 and the pressure receiving member 9 so as to effect a direct force transmission between the master piston 10 and the pressure receiving member 9. A slight clearance is defined between the reaction disc 8 and the front end surface of the plunger 7 under a non-operative condition illustrated in FIGS. 13 and 14.

As shown in FIG. 14, a communicating hole 6c is axially defined in the spool 6 and a stepped portion 6e is formed at the outer surface of the spool 6. Annular grooves 6f, 6g are also defined at the outer surface of the smaller diameter portion of the spool 6. The communicating hole 6c communicates with the annular groove 6g via a radially extending communicating hole 6h defined in the spool 6. When the hydraulic brake apparatus is not activated as illustrated in FIG. 14, the annular grooves 6f, 6g face opening portions of the communicating holes 5g, 5h, respectively. The power chamber R5 communicates with the communicating hole 6c via the communicating hole 5h, the annular groove 6g and the communicating hole 6h. When the spool 6 is moved in the forward direction, the communication between the power chamber R5 and the communicating hole 6c is interrupted. Further, the power chamber R5 communicates with an inlet port 1f via the communicating hole 5g, the annular groove 6f, and the communicating hole 5f. A hydraulic pressure introducing chamber R7 is defined behind the stepped portion 6e and serves to supply hydraulic pressure outputted from the auxiliary hydraulic pressure source AS to the hydraulic pressure introducing chamber R7 via the communicating hole 5e when the automatic brake control is performed. Further, a hydraulic pressure chamber is defined between a rear end of the spool 6 and the input member 4. The hydraulic pressure chamber with the reservoir RS, and yet does not communicate with the hydraulic pressure introducing chamber R7.

An annular groove 7g is defined at the outer surface of the plunger 7. An axially extending hole 7e defined in the plunger 7 opens in the rearward direction and faces an opening portion of the communicating hole 6c of the spool 6. The hole 7e communicates with the annular groove 7g via a radially extending communicating hole 7f defined in the plunger 7. Therefore, a space in which is disposed the plunger 7 communicates with the drain port 1d via the communicating hole 6c, the communicating holes 4c, 4d, the annular groove 4e, the communicating hole 5d, and the annular chamber R6.

An inlet port 1e, the inlet port 1f and the drain port 1d are defined at the rear side of housing 1. The drain port 1d communicates with the reservoir RS. The inlet ports 1e, 1f communicate with the auxiliary hydraulic pressure source AS. The inlet port 1e communicates with the annular chamber R3, communicates with the auxiliary hydraulic pressure source AS via the linear solenoid valve V1, and communicates with the reservoir RS via the linear solenoid valve V2. The inlet side of a hydraulic pump HP included in the auxiliary hydraulic pressure source AS communicates with the reservoir RS. The outlet side of the hydraulic pump HP communicates with the accumulator AC via the check valve C1 and communicates with the inlet port 1f. As described above, the outlet side of the hydraulic pump HP further communicates with the inlet port 1e via the solenoid valve V1.

A fluid passage 1g is defined in the housing 1 for connecting the second pressure chamber R2 and the power chamber R5. A normally open-type pressure differential responsive check valve CV (hereinafter referred to as a check valve CV) is disposed in the fluid passage 1g. The check valve CV normally connects the second pressure chamber R2 with the power chamber R5. The check valve CV is operated to be closed in response to a pressure differential between the power chamber R5 and the second pressure chamber R2. When the hydraulic pressure in the power chamber R5 is larger than the hydraulic pressure in the second pressure chamber R2 and when the pressure differential between the two chambers R2, R5 is equal to or above a predetermined value, the communication between the power chamber R5 and the second pressure chamber R2 is interrupted by the closed check valve CV. On the other hand, when the hydraulic brake apparatus is not activated, the pressure differential between the two chambers R2, R5 is not generated and the check valve CV is maintained at the open position. Therefore, when the pressure chamber R2 is required to be filled with brake fluid, an evacuation of the air in the second pressure chamber R2 can be performed easily and accurately by bleeding air from the power chamber R5 and by introducing the brake fluid from the reservoir RS via the fluid supply port 1j to the second pressure chamber R2.

The operation of the hydraulic brake apparatus having the construction described above is as follows. When the brake pedal 2 is under the non-operated condition, each component of the hydraulic brake apparatus is located at the initial position illustrated in FIGS. 13 and 14. In this situation, the hydraulic pressure booster HB is under the non-operated condition with the linear solenoid valve V1 in the closed position and the linear solenoid valve V2 in the open position. Under the above condition, the annular chamber R4 communicates with the accumulator AC, and yet the communication between the communicating hole 5f and the power chamber R5 is blocked by the spool 6. The power chamber R5 communicates with the reservoir RS via a communicating hole 5h, the annular groove 6g, the communicating holes 6h, 6c, the communicating holes 4c, 4d, the annular groove 4e, the communicating hole 5d, the annular chamber R6, and the drain port 1d. The power chamber R5 further communicates with the second pressure chamber R2 via the fluid passage 1g and the check valve CV. Therefore, when the auxiliary hydraulic pressure source AS is driven, the power piston 5 is applied only with a rearward pushing force by the hydraulic pressure in the annular chamber R4 so as to be maintained at the initial position illustrated in FIGS. 13 and 14.

When the brake pedal 2 is operated, the spool 6 is moved in the forward direction corresponding to the forward movement of the input member 4 to interrupt the communication between the power chamber R5 and the communicating hole 6c via the communicating hole 5h blocked by the spool 6. The annular groove 6f faces the opening portions of the communicating holes 5f, 5g. Therefore, power hydraulic pressure is fed into the power chamber R5 via the inlet port 1f, the communicating hole 5f, the annular groove 6f, and the communicating holes 5g, 5h. The inlet port 1e communicates with the hydraulic pressure introducing chamber R7 via the annular chamber R3 and the communicating hole 5e. The linear solenoid valve V1 is still in the closed position and the linear solenoid valve V2 is still in the open position. The inlet port 1e communicates with the reservoir RS via the linear solenoid valve V2. Therefore, the spool 6 is moved forward in response to the forward movement of the input member 4, i.e. in response to the brake pedal operation. When the pressure differential between the power chamber R5 and the second pressure chamber R2 becomes equal to or greater than the predetermined value under the condition described above, the check valve CV is operated to be closed. The fluid passage 1g is thus interrupted by the check valve CV, and the second pressure chamber R2 becomes a hydraulically sealed space filled with the brake fluid.

As described above, while the hydraulic pressure booster HB has been activated after the second pressure chamber R2 becomes the hydraulically sealed space, a pushing pressure applied to the front end surface of the power piston 5 by the second pressure chamber R2 is balanced relative to the brake pedal operating force and a pushing pressure applied to the rear end surface of the power piston 5. An effective cross-section of the power piston 5 is larger than the effective cross-section of the master piston 10 so that a clearance between the master piston 10 and the power piston 5 is enlarged by the forward movement of the master piston 10 corresponding to the forward movement of the power piston 5. In this case, the master piston 10 is hydraulically connected to the power piston 5 and is moved integrally with the power piston 5. As described above, when the hydraulic pressure booster HB is activated, the power piston 5 and the master piston 10 are hydraulically integrated by the brake fluid filled in the second pressure chamber R2. The power piston 5 and the master piston 10 are integrally moved forward by the clearance defined between the power piston 5 and the master piston 10. Therefore, the stroke of the brake pedal 2 is reduced.

When the automatic brake control is performed with the brake pedal 2 (shown in FIG. 13) under the non-operated condition, the auxiliary hydraulic pressure source AS is activated with the solenoid valve V1 in the open position and the solenoid valve V2 in the closed position. Each component is still located at the initial position shown in FIG. 14 immediately after the automatic brake control was performed. Therefore, the communication between the communicating hole 5f and the power chamber R5 is interrupted by the spool 6. The hydraulic pressure outputted from the auxiliary hydraulic pressure source AS is supplied to the hydraulic pressure introducing chamber R7 via the inlet port 1e and the communicating hole 5e. The power chamber R5 thus communicates with the auxiliary hydraulic pressure source AS via the communicating hole 5g, the annular groove 6f, the communicating hole 5f and the inlet port 1f. Therefore, the master piston 10 is moved forward corresponding to the forward movement of the power piston 5 so that the brake hydraulic pressure is supplied to each wheel brake cylinder mounted on each vehicle wheel.

Under the above condition, the fluid passage 1g is interrupted by virtue of the check valve CV being at the closed position corresponding to the pressure differential between the power chamber R5 and the second pressure chamber R2 so that the second pressure chamber R2 becomes the hydraulically sealed space filled with the brake fluid. Therefore, the master piston 10 is moved forward in response to the pushing force corresponding to the effective area of the power piston 5 by the brake hydraulic pressure introduced into the power chamber R5. Therefore, when the brake pedal 2 is under the non-operative condition, a desired brake hydraulic pressure can be generated by controlling the auxiliary hydraulic pressure source AS, and the linear solenoid valves V1, V2 when needed. The brake hydraulic pressure in the second pressure chamber R2 is applied to the pressure receiving member 9 and the reaction disc 8. A forward area of the input member 4 communicates with the reservoir RS via the drain port 1d. Therefore, the reaction force of the pushing force applied to the pressure receiving member 9 and the reaction disc 8 is not transmitted to the input member 4. The pushing force applied to the pressure receiving member 9 and the reaction disc 8 is opposed by the power hydraulic pressure outputted from the auxiliary hydraulic pressure source AS to the power piston 5. Further, the power hydraulic pressure outputted from the auxiliary hydraulic pressure source AS is fed into the hydraulic pressure introducing chamber R7 defined between the stepped portion 6e and the power piston 5. The hydraulic pressure introducing chamber R7 is structurally separated from the front chamber of the input member 4. Therefore, the power hydraulic pressure fed into the hydraulic pressure introducing chamber R7 from the auxiliary hydraulic pressure source AS is not transmitted to the input member 4 as a reaction force.

In the embodiment described above, the brake switch BS which serves as a brake operating detecting means is operated to be closed or opened in response to the depressing operation of the brake operating member. The brake operating detecting means can also be comprised of a detecting device that detects the depressing force applied to the brake operating member or the stroke of the brake operating member.

The principles, preferred embodiment and modes of operation of the present invention have been described In the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle comprising:
a brake operating member;
a master cylinder including a master piston which is moved forward in response to a depressing operation of the brake operating member to pressurize brake fluid in a reservoir and output a master cylinder hydraulic pressure to wheel brake cylinders mounted on vehicle wheels in response to the forward movement of the master piston;
an auxiliary hydraulic pressure source for pressurizing the brake fluid in the reservoir to a predetermined pressure level and for outputting a power hydraulic pressure;
master piston driving means for driving the master piston with the power hydraulic pressure outputted from the auxiliary hydraulic pressure source;
a linear solenoid valve unit for controlling the power hydraulic pressure supplied to the master piston driving means from the auxiliary hydraulic pressure source and for controlling a driving force applied to the master piston;
a hydraulic pressure control valve device disposed between the master cylinder and the wheel brake cylinders for controlling the master cylinder hydraulic pressure supplied to the wheel brake cylinders;
a pressure sensor for detecting the master cylinder hydraulic pressure;
control means for controlling the linear solenoid valve unit and the hydraulic pressure control valve device;
the control means including comparing means for comparing the master cylinder hydraulic pressure detected by the pressure sensor with a predetermined reference hydraulic pressure when the linear solenoid valve unit is electrically excited when communication between the master cylinder and the wheel brake cylinders is interrupted by the hydraulic pressure control valve device while a vehicle engine is activated and the brake operating member is not operated, and correcting means for correcting an electric current actually supplied to the linear solenoid valve unit in response to a result of the comparison performed by the comparing means.

2. The hydraulic brake apparatus for a vehicle according to claim 1, wherein the control means further comprises estimating means for estimating a temperature of the linear solenoid valve unit at a predetermined period based upon a condition of excitation of the linear solenoid valve unit and a running condition of the vehicle, the correcting means correcting the electric current actually supplied to the linear solenoid valve unit when a variation of an estimated temperature per period continues to be less than a predetermined value for a predetermined period of time.

3. The hydraulic brake apparatus for a vehicle according to claim 2, wherein the temperature of the linear solenoid valve unit is estimated at the predetermined period by the estimating means based upon the electric current actually supplied to the linear solenoid valve unit and based upon a speed of the vehicle.

4. The hydraulic brake apparatus for a vehicle according to claim 1, comprising brake operating detecting means for detecting whether or not the brake operating member is operated, the control means terminating a process for correcting the electric current actually supplied to the linear solenoid valve unit when the brake operating detecting means detects that the brake operating member is operated.

5. The hydraulic brake apparatus for a vehicle according to claim 4, wherein the brake operating detecting means includes a brake switch operated to be closed or opened in response to depressing operation of the brake operating member.

6. The hydraulic brake apparatus for a vehicle according to claim 4, wherein the brake operating detecting means includes detecting means for detecting a depressing force applied to the brake operating member or a stroke of the brake operating member.

7. The hydraulic brake apparatus for a vehicle according to claim 1, wherein the master piston driving means comprises regulating means connected to the auxiliary hydraulic pressure source and the reservoir for regulating the power hydraulic pressure outputted from the auxiliary hydraulic pressure source to a predetermined pressure level for driving the master piston by the regulated hydraulic pressure, the linear solenoid valve unit controlling the power hydraulic pressure supplied from the auxiliary hydraulic pressure source to the regulating means.

8. The hydraulic brake apparatus for a vehicle according to claim 7, wherein the linear solenoid valve unit includes a normally closed type linear solenoid valve for controlling opening and closing of a hydraulic pressure supplying passage connecting the regulating means with the auxiliary hydraulic pressure source and a normally open type linear solenoid valve for controlling opening and closing of a hydraulic pressure discharging passage connecting the regulating means with the reservoir.

9. The hydraulic brake apparatus for a vehicle according to claim 7, wherein the regulating means includes a hydraulically actuated booster device for regulating the power hydraulic pressure.

10. A hydraulic brake apparatus for a vehicle comprising:
a brake operating member;
a master cylinder, including a master piston, which pressurizes brake fluid in a reservoir through movement of the master piston and outputs a master cylinder hydraulic pressure to wheel brake cylinders in response to the movement of the master piston;
an auxiliary hydraulic pressure source connected to the master cylinder to pressurize the brake fluid in the reservoir to a predetermined pressure level and output a power hydraulic pressure to drive the master piston;
a linear solenoid valve unit disposed between the master cylinder and the auxiliary hydraulic pressure source to control the power hydraulic pressure supplied to the master cylinder from the auxiliary hydraulic pressure source and control a driving force applied to the master piston;
a hydraulic pressure control valve device disposed between the master cylinder and the wheel brake cylinders to control the master cylinder hydraulic pressure supplied to the wheel brake cylinders;
a pressure sensor detecting the master cylinder hydraulic pressure;
comparing means for comparing the master cylinder hydraulic pressure detected by the pressure sensor with a predetermined reference hydraulic pressure during electrical excitation of the linear solenoid valve unit when communication between the master cylinder and the wheel brake cylinders is interrupted by the hydraulic pressure control valve device and while an engine of the vehicle is activated and the brake operating member is not operated; and correcting means for correcting electric current actually supplied to the linear solenoid valve unit in response to a result of the comparison performed by the comparing means.

11. The hydraulic brake apparatus for a vehicle according to claim 10, comprising estimating means for estimating a temperature of the linear solenoid valve unit at a predetermined period based upon a condition of excitation of the linear solenoid valve unit and a running condition of the vehicle, the correcting means correcting the electric current actually supplied to the linear solenoid valve unit when a variation of an estimated temperature per period continues to be less than a predetermined value for a predetermined period of time.

12. The hydraulic brake apparatus for a vehicle according to claim 11, wherein the temperature of the linear solenoid valve unit is estimated at the predetermined period by the estimating means based upon the electric current actually supplied to the linear solenoid valve unit and based upon a speed of the vehicle.

13. The hydraulic brake apparatus for a vehicle according to claim 10, comprising brake operating detecting means for detecting whether or not the brake operating member is operated, the correction of the electric current actually supplied to the linear solenoid valve unit being terminated when the brake operating detecting means detects that the brake operating member is operated.

14. The hydraulic brake apparatus for a vehicle according to claim 10, comprising regulating means connected to the auxiliary hydraulic pressure source and the reservoir for regulating the power hydraulic pressure outputted from the auxiliary hydraulic pressure source to a predetermined pressure level and driving the master piston by the regulated hydraulic pressure, the linear solenoid valve unit controlling the power hydraulic pressure supplied from the auxiliary hydraulic pressure source to the regulating means.

15. The hydraulic brake apparatus for a vehicle according to claim 14, wherein the linear solenoid valve unit includes a normally closed type linear solenoid valve which controls communication between the regulating means and the auxiliary hydraulic pressure source, and a normally open type linear solenoid valve which controls communication between the regulating means and the reservoir.

16. The hydraulic brake apparatus for a vehicle according to claim 14, wherein the regulating means includes a hydraulically actuated booster device for regulating the power hydraulic pressure.

17. A method of controlling supply of electric current to a linear solenoid valve unit in a vehicle hydraulic brake apparatus, the vehicle hydraulic brake apparatus comprising a brake operating member, a master cylinder which pressurizes brake fluid in a reservoir through movement of a master piston and outputs a master cylinder hydraulic pressure to wheel brake cylinders mounted on vehicle wheels in response to the movement of the master piston, an auxiliary hydraulic pressure source which pressurizes the brake fluid in the reservoir to a predetermined pressure level and outputs a power hydraulic pressure to move the master piston, and a hydraulic pressure control valve device disposed between the master cylinder and the wheel brake cylinders for controlling the master cylinder hydraulic pressure supplied to the wheel brake cylinders, the linear solenoid valve unit controlling the power hydraulic pressure supplied to the master cylinder from the auxiliary hydraulic pressure source to control a driving force applied to the master piston, the method comprising:

detecting the master cylinder hydraulic pressure;

comparing the detected master cylinder hydraulic pressure with a predetermined reference hydraulic pressure when the linear solenoid valve unit is electrically excited while communication between the master cylinder and the wheel brake cylinders is interrupted by the hydraulic pressure control valve device and while an engine of the vehicle is activated and the brake operating member is not operated; and correcting electric current actually supplied to the linear solenoid valve unit the comparison of the detected master cylinder hydraulic pressure with the predetermined reference hydraulic pressure.

18. The method according to claim 17, including estimating a temperature of the linear solenoid valve unit at a predetermined period based upon a condition of excitation of the linear solenoid valve unit and a running condition of the vehicle, and correcting the electric current actually supplied to the linear solenoid valve unit when a variation of an estimated temperature per period continues to be less than a predetermined value for a predetermined period of time.

19. The method according to claim 18, wherein the temperature of the linear solenoid valve unit is estimated at the predetermined period based upon the electric current actually supplied to the linear solenoid valve unit and a speed of the vehicle.

20. The method according to claim 17, including detecting whether the brake operating member is operated, and terminating correction of the electric current actually supplied to the linear solenoid valve unit when it is detected that the brake operating member is operated.

* * * * *